US009323008B2

(12) United States Patent
He et al.

(10) Patent No.: US 9,323,008 B2
(45) Date of Patent: Apr. 26, 2016

(54) OPTOELECTRONIC STRUCTURES HAVING MULTI-LEVEL OPTICAL WAVEGUIDES AND METHODS OF FORMING THE STRUCTURES

(71) Applicant: International Business Machines Corporation, Armonk, NY (US)

(72) Inventors: Zhong-Xiang He, Essex Junction, VT (US); Qizhi Liu, Lexington, MA (US); Ronald G. Meunier, Westford, VT (US); Steven M. Shank, Jericho, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 31 days.

(21) Appl. No.: 14/224,210

(22) Filed: Mar. 25, 2014

(65) Prior Publication Data

US 2015/0277064 A1     Oct. 1, 2015

(51) Int. Cl.
*G02B 6/42*    (2006.01)
*G02B 6/122*   (2006.01)
*G02B 6/136*   (2006.01)
*G02B 6/132*   (2006.01)

(52) U.S. Cl.
CPC .................. *G02B 6/42* (2013.01); *G02B 6/122* (2013.01); *G02B 6/132* (2013.01); *G02B 6/136* (2013.01)

(58) Field of Classification Search
CPC .......... G02B 6/42; G02B 6/122; G02B 6/125; G02B 6/132; G02B 6/136
See application file for complete search history.

(56) References Cited

U.S. PATENT DOCUMENTS

| | | | |
|---|---|---|---|
| 5,123,078 A | * | 6/1992 | Thomas .................. G02B 6/43 385/129 |
| 5,266,794 A | | 11/1993 | Olbright et al. |
| 6,097,864 A | | 8/2000 | Kropp |
| 6,324,313 B1 | | 11/2001 | Allman et al. |
| 6,480,643 B1 | | 11/2002 | Allman et al. |
| 6,690,845 B1 | | 2/2004 | Yoshimura et al. |
| 6,845,184 B1 | | 1/2005 | Yoshimura et al. |
| 6,995,441 B2 | | 2/2006 | Geusic et al. |
| 8,290,319 B2 | | 10/2012 | Harada et al. |
| 2010/0046883 A1 | | 2/2010 | Dangel et al. |
| 2011/0091157 A1 | | 4/2011 | Yao et al. |
| 2012/0039576 A1 | | 2/2012 | Dangel et al. |
| 2012/0321251 A1 | | 12/2012 | Yao et al. |

* cited by examiner

*Primary Examiner* — Laura Menz
*Assistant Examiner* — Candice Y Chan
(74) *Attorney, Agent, or Firm* — Gibb & Riley, LLC; Michael J. LeStrange, Esq.

(57) ABSTRACT

Disclosed are structures with an optical waveguide having a first segment at a first level and a second segment extending between the first level and a higher second level and further extending along the second level. Specifically, the waveguide comprises a first segment between first and second dielectric layers. The second dielectric layer has a trench, which extends through to the first dielectric layer and which has one side positioned laterally adjacent to an end of the first segment. The waveguide also comprises a second segment extending from the bottom of the trench on the side adjacent to the first segment up to and along the top surface of the second dielectric layer on the opposite side of the trench. A third dielectric layer covers the second segment in the trench and on the top surface of the second dielectric layer. Also disclosed are methods of forming such optoelectronic structures.

17 Claims, 21 Drawing Sheets

OPTOELECTRONIC STRUCTURES HAVING MULTI-LEVEL OPTICAL WAVEGUIDES AND METHODS OF FORMING THE STRUCTURES

BACKGROUND

The structures and methods disclosed herein relate to optoelectronics and, more particularly, to optoelectronic structures having an optical waveguide that provides a multi-level optical signal pathway and methods of forming such optoelectronic structures.

More specifically, in optoelectronics and, particularly, in optoelectronic integrated circuits, optical waveguides provide on-chip optical signal pathways for transmitting optical signals (i.e., light signals) between on-chip and/or off-chip optical devices including, but not limited to, optical fibers, optical transmitters, optical receivers, and electrical-to-optical or optical-to-electrical transducers. Generally, an optical waveguide includes a core surrounded by cladding. Both the core and the cladding comprise light-transmissive materials (e.g., light-transmissive dielectric materials); however, the core material(s) have a refractive index that is higher than that of the cladding material(s) so that light signals received by the optical waveguide are confined to and propagated along the core. Typically, optical waveguides are formed as single-level structures. That is, they are formed with one or more linear or angled segments on a single level of a chip (e.g., on a single horizontal plane on a chip) and, thereby only allow communication of light signals between optical devices on that same level. Oftentimes, however, it is necessary to communicate light signals between optical devices at different levels (e.g., on different horizontal planes on a chip), but techniques for forming multi-level optical waveguides can be inefficient and costly. Therefore, there is a need in the art for an optoelectronic structure having a multi-level optical waveguide and an efficient and cost-effective method of forming such an optoelectronic structure.

SUMMARY

In view of the foregoing, disclosed herein are optoelectronic structures having an optical waveguide comprising two discrete segments that provide a multi-level optical signal pathway on a chip. The optical waveguide can comprise a first segment at a first level and a second segment, which extends between the first level and a higher second level and which further extends along the second level. Specifically, the optical waveguide can comprise a first segment between a first dielectric layer and a second dielectric layer. A trench can extend through the second dielectric layer such that it has a first side positioned laterally adjacent to one end of the first segment and such that it has a second side opposite the first side. The optical waveguide can further comprise a second segment with a first portion and a second portion. The first portion can be within the trench and can extend from the first side on the bottom adjacent to the first segment up to the top on the second side. The second portion can be continuous with the first portion and can extend laterally onto the top surface of the second dielectric layer. A third dielectric layer can cover the second segment both in the trench and on the top surface of the second dielectric layer. Also disclosed herein are methods of forming such optoelectronic structures.

More particularly, disclosed herein is an optoelectronic structure with an optical waveguide comprising two discrete segments (i.e., a first segment and a second segment) that provide a multi-level optical signal pathway on a chip.

The first segment of the optical waveguide can be on a first level and, particularly, on a first dielectric layer. A second dielectric layer can be positioned above the first dielectric layer such that it covers the first segment of the optical waveguide. This second dielectric layer can have a bottom surface immediately adjacent to the first dielectric layer and a top surface opposite the bottom surface. Additionally, this second dielectric layer can have a trench, which extends from the top surface of the second dielectric layer to the bottom surface of the second dielectric layer and which has a first side comprising a first sidewall and a second side opposite the first side and comprising a second sidewall. The trench can specifically be positioned within the second dielectric layer so that the first sidewall is adjacent to one end of the first segment. For example, the trench can be positioned such that one end of the first segment is exposed in the lowermost portion of the first sidewall.

The second segment of the optical waveguide can extend from the first level onto a higher second level and, particularly, onto the top surface of the second dielectric layer. Specifically, the second segment can have two continuous portions (i.e., a first portion and a second portion). The first portion can extend through the trench and, particularly, can extend from the bottom of the trench adjacent to the first segment on the first side up to the top surface of the second dielectric layer on the second side (i.e., up to the top of the trench on the second side). In one optoelectronic structure, this first portion can line (i.e., can be positioned immediately adjacent to) a portion of the first dielectric layer exposed at the bottom of the trench and can also line the second sidewall on the second side of the trench. Alternatively, the first portion can curve upward from the bottom of the trench to the top surface of the second dielectric layer such that the distance between the first portion and the second sidewall tapers from the bottom of the trench to the top surface of the second dielectric layer. In any case, the second portion can be continuous with the first portion and can extend onto the top surface of the second dielectric layer (i.e., onto the second level) adjacent to the second side of the trench and can further extend laterally away from that second side.

A third dielectric layer can be positioned on the top surface of the second dielectric layer, covering the second portion of the second segment of the optical waveguide. This third dielectric layer can also fill the trench so as to also cover the first portion of the second segment of the optical waveguide.

It should be noted that to ensure proper transmission of light signals through the optical waveguide, the optical waveguide and, particularly, both the first and second segments thereof will each have a higher refractive index than the surrounding dielectric material. That is, the first and second segments will each have a higher refractive index than the first dielectric layer, the second dielectric layer and the third dielectric layer.

Also disclosed herein are methods for forming the above-described optoelectronic structures with multi-level optical waveguides.

One method of forming an optoelectronic structure with a multi-level optical waveguide can comprise forming a first segment of an optical waveguide on a first dielectric layer (i.e., on a first level). Specifically, a first light-transmissive layer can be formed on the first dielectric layer and then etched to form a first light-transmissive body and, particularly, the first segment.

Then, a second dielectric layer can be formed on the first dielectric layer so as to cover the first segment. Thus, the second dielectric layer will have a bottom surface adjacent to the first dielectric layer and the first segment and a top surface opposite the bottom surface.

Next, a trench can be formed that extends through the second dielectric layer from the top surface of the second dielectric layer to the bottom surface of the second dielectric layer. Specifically, this trench can be formed so that it has a first side comprising a first sidewall and a second side opposite the first side and comprising a second sidewall. This trench can further be formed so that the first sidewall is adjacent to one end of the first segment. For example, this trench can further be formed such that one end of the first segment is exposed at the lowermost portion of the first sidewall.

After the trench is formed, a second segment of the optical waveguide can be formed such that it extends from the first level to a higher second level and, particularly, onto the top surface of the second dielectric layer. Specifically, the second segment can be formed such that it comprises two continuous portions (i.e., a first portion and a second portion). The first portion can extend through the trench from the bottom adjacent to the first segment on the first side, along the portion of the first dielectric layer at the bottom of the trench and along the second sidewall on the second side up to the top surface of the second dielectric layer. The second portion can be continuous with the first portion and can extend onto the top surface of the second dielectric layer (i.e., onto the second level) adjacent to the second side of the trench and can extend laterally away from that second side.

To accomplish this, after forming the trench, a second light-transmissive layer can be formed so that it is on the top surface of the second dielectric layer and so that it also lines the bottom and sidewalls of the trench. This second light-transmissive layer can be etched so as to form a second light-transmissive body and, particularly, the second segment with the first portion and the second portion. That is, the second light-transmissive layer can be etched so as to define the shape of the first portion, which extends laterally across the bottom of the trench from adjacent to the first segment at the first sidewall to the second sidewall and which further extends along the second sidewall from the bottom of the trench to the top surface of the second dielectric layer, and so as to define the shape of the second portion, which extends laterally from the first portion onto the top surface of the second dielectric layer and away from the second side.

Once the second segment is formed, a third dielectric layer can be formed on the top surface of the second dielectric layer so that it covers the second portion of the second segment of the optical waveguide. This third dielectric layer can also be formed so that it fills the trench, thereby covering the first portion of the second segment of the optical waveguide within the trench.

It should be noted that to ensure proper transmission of light signals through the optical waveguide formed according to this method, the optical waveguide and, particularly, both the first and second segments thereof should be formed so as to have a higher refractive index than the surrounding dielectric material. That is, the first and second segments should be formed so as to have a higher refractive index than the first dielectric layer, the second dielectric layer and the third dielectric layer.

Other methods of forming optoelectronic structures with multi-level optical waveguides can comprise forming a first segment of an optical waveguide on a first dielectric layer (i.e., on a first level). Specifically, a first light-transmissive layer can be formed on the first dielectric layer and then etched to form a first light-transmissive body and, particularly, the first segment.

Then, a second dielectric layer can be formed on the first dielectric layer so as to cover the first segment. Thus, the second dielectric layer can have a bottom surface adjacent to the first dielectric layer and the first segment and a top surface opposite the bottom surface.

In these methods, a trench can be formed in the second dielectric layer such that it extends from the top surface of the second dielectric layer to the bottom surface of the second dielectric layer and such that it has a first side comprising a first sidewall and a second side opposite the first side and comprising a second sidewall. This trench can specifically be formed such that the first sidewall is adjacent to one end of the first segment. For example, this trench can be formed such that one end of the first segment is exposed at the lowermost portion of the first sidewall. Additionally, a second segment of the optical waveguide can be formed such that it comprises two continuous portions (i.e., a first portion and a second portion). The first portion can extend through the trench from the first level to a higher second level and, particularly, can have an end at the bottom of the trench adjacent to the first segment on the first side and can further curve upward from the bottom of the trench to the top surface of the second dielectric layer such that the distance between the first portion and the second sidewall tapers from the bottom of the trench to the top surface of the second dielectric layer. The second portion can be continuous with the first portion and can extend onto the top surface of the second dielectric layer (i.e., onto the second level) adjacent to the second side and can extend laterally away from that second side.

In order to form such a second segment, before the trench is formed, a second light-transmissive layer can be formed on the second dielectric layer and etched to form a second light-transmissive body. This second light-transmissive body can have an end section that partially overlays the end of the first segment. Then, the trench can be formed so that it is aligned below the end section of the second light-transmissive body. As result, upon formation of the trench, the end section, which is unsupported, curves downward (i.e., bends downward) into the trench, thereby forming the second segment. Alternatively, the second light-transmissive body can overlay the first segment and the trench can be formed such that it is aligned below a center section of the second light-transmissive body. In this case, after the trench is formed, the second light-transmissive body is cut near the first side of the trench such that the center section becomes unsupported and, as a result, the center section curves downward (i.e., bends) into the trench, thereby forming the second segment.

Once the second segment is formed, a third dielectric layer can be formed on the top surface of the second dielectric layer so that it covers the second portion of the second segment of the optical waveguide. This third dielectric layer can also be formed so that it fills the trench, thereby covering and, specifically, surrounding exposed surfaces of the first portion of the second segment of the optical waveguide within the trench.

It should be noted that to ensure proper transmission of light signals through the optical waveguide formed according to these methods, the optical waveguide and, particularly, both the first and second segments thereof should be formed so as to have a higher refractive index than the surrounding dielectric material. That is, the first and second segments should be formed so as to have a higher refractive index than the first dielectric layer, the second dielectric layer and the third dielectric layer.

BRIEF DESCRIPTION OF THE SEVERAL VIEWS OF THE DRAWINGS

The embodiments herein will be better understood from the following detailed description with reference to the drawings, which are not necessarily drawn to scale and in which.

DETAILED DESCRIPTION

As mentioned above, in optoelectronics and, particularly, in optoelectronic integrated circuits, optical waveguides provide on-chip optical signal pathways for transmitting optical signals (i.e., light signals) between on-chip and/or off-chip optical devices including, but not limited to, optical fibers, optical transmitters, optical receivers, and electrical-to-optical or optical-to-electrical transducers. Generally, an optical waveguide includes a core surrounded by cladding. Both the core and the cladding comprise light-transmissive materials (e.g., light-transmissive dielectric materials); however, the core material(s) have a refractive index that is higher than that of the cladding material(s) so that light signals received by the optical waveguide are confined to and propagated along the core. Typically, optical waveguides are formed as single-level structures. That is, they are formed with one or more linear or angled segments on a single level of a chip (e.g., on a single horizontal plane on a chip) and, thereby only allow communication of light signals between optical devices on that same level. Oftentimes, however, it is necessary to communicate light signals between optical devices at different levels (e.g., on different horizontal planes on a chip), but techniques for forming multi-level optical waveguides can be inefficient and costly. Therefore, there is a need in the art for an optoelectronic structure having a multi-level optical waveguide and an efficient and cost-effective method of forming such structure.

In view of the foregoing, disclosed herein are optoelectronic structures having an optical waveguide comprising two discrete segments that provide a multi-level optical signal pathway on a chip. The optical waveguide can comprise a first segment at a first level and a second segment, which extends between the first level and a higher second level and which further extends along the second level. Specifically, the optical waveguide can comprise a first segment between a first dielectric layer and a second dielectric layer. A trench can extend through the second dielectric layer such that it has a first side positioned laterally adjacent to one end of the first segment and such that it has a second side opposite the first side. The optical waveguide can further comprise a second segment with a first portion and a second portion. The first portion can be within the trench and can extend from the first side on the bottom adjacent to the first segment up to the top on the second side. The second portion can be continuous with the first portion and can extend laterally onto the top surface of the second dielectric layer. A third dielectric layer can cover the second segment both in the trench and on the top surface of the second dielectric layer. Also disclosed herein are methods of forming such optoelectronic structures.

Figure 1:
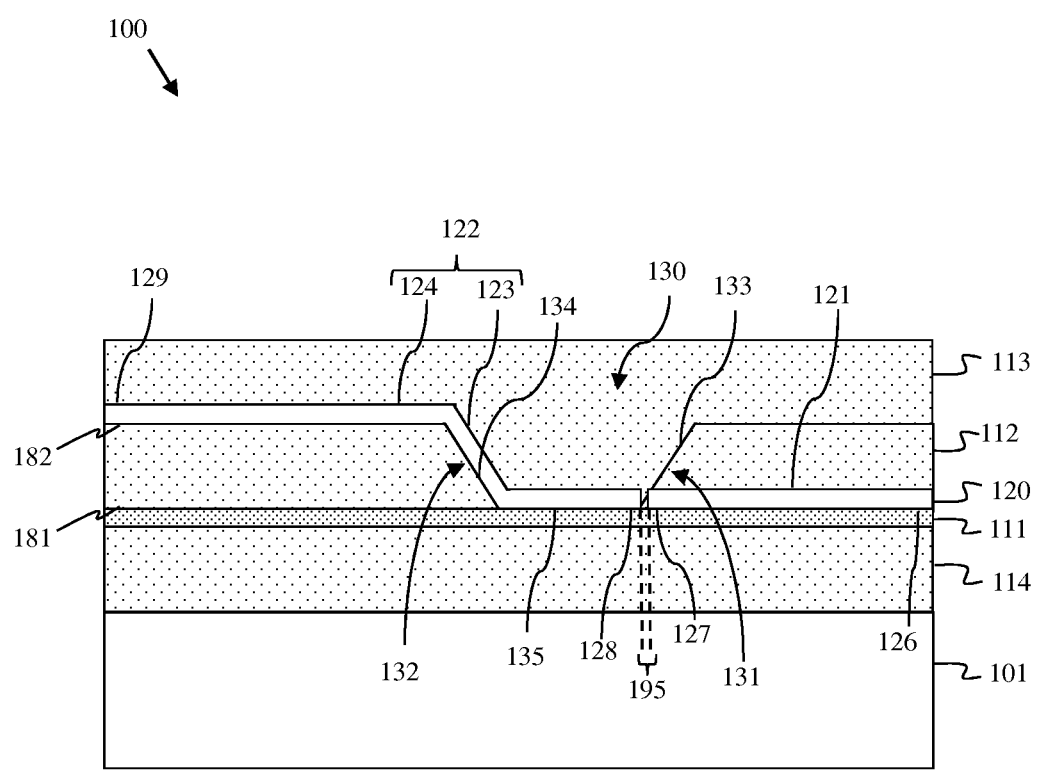
FIG. 1 is a cross-section diagram illustrating an optoelectronic structure incorporating a multi-level optical waveguide.
Figure 2:
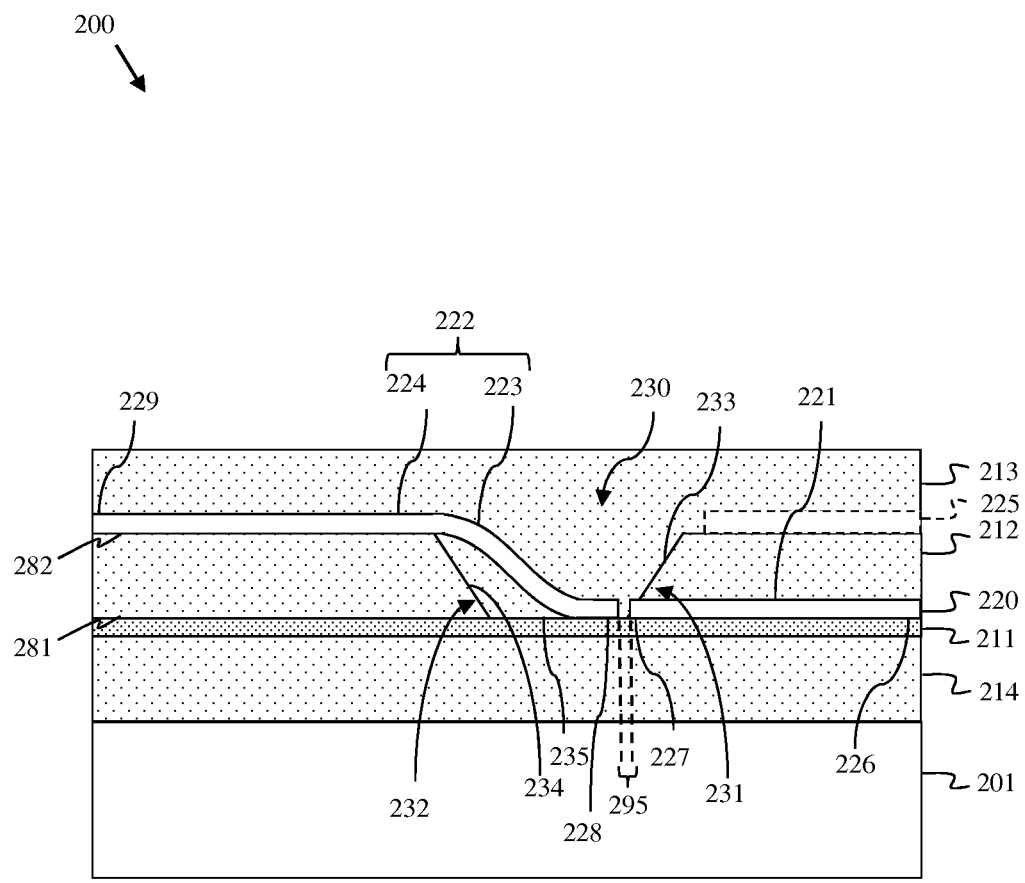
FIG. 2 is a cross-section diagram illustrating another optoelectronic structure incorporating a multi-level optical waveguide.

More particularly, referring to FIG. 1 and FIG. 2, disclosed herein are optoelectronic structures 100, 200 on a substrate 101, 201 (e.g., a semiconductor substrate, such as a silicon substrate, or any other suitable substrate). Each optoelectronic structure 100, 200 can comprise an optical waveguide 120, 220 and this optical waveguide 120, 220 can comprise two discrete segments (i.e., a first segment 121, 221 and a second segment 122, 222) that provide a multi-level optical signal pathway on a chip between, for example, on-chip optical devices at different levels and/or between ports to off-chip optical devices at different levels (not shown).

The first segment 121, 221 of the optical waveguide 120, 220 can be on a first level and, particularly, on the top surface of a first dielectric layer 111, 211 above the substrate 101, 201. This first dielectric layer 111, 211 can be immediately adjacent to the substrate 101, 201 or, alternatively, can be separated from the substrate 101, 201 by one or more additional layers 114 (e.g., one or more additional dielectric layer(s)). This first segment 121, 221 can comprise, for example, a first light-transmissive body comprising at least one light-transmissive material (e.g., a light-transmissive dielectric material). The first segment 121, 221 can have an essentially rectangular cross-sectional shape (e.g., a square cross-sectional shape) or, alternatively, can have an essentially circular cross-sectional shape. In any case, the first segment 121, 221 can have a predetermined cross-sectional area. The first segment 121, 221 can further have opposing ends 126-127, 226-227 with one end 126, 226 being adjacent to any one of an on-chip optical device on the same level or a port to an off-chip optical device (not shown). This first segment 121, 221 can be essentially linear, as illustrated. Alternatively, this first segment 121, 221 can be angled or curved. It should be noted that any angles or curves should be wide enough to allow for light signal propagation through the first segment 121, 221.

A second dielectric layer 112, 212 can be positioned above the first dielectric layer 111, 211 such that it covers the first segment 121, 221 of the optical waveguide 120, 220. This second dielectric layer 112, 212 can have a bottom surface 181, 281 immediately adjacent to the first dielectric layer 111, 211 and the first segment 121, 221 and a top surface 182, 282 opposite the bottom surface 181, 281.

A trench 130, 230 can extend through the second dielectric layer 112, 212 from the top surface 182, 282 to the bottom surface 181, 281. This trench 130, 230 can have a first side 131, 231 comprising a first sidewall 133, 233 and a second side 132, 232 opposite the first side 131, 231 and comprising a second sidewall 134, 234. The trench 130, 230 can specifically be positioned within the second dielectric layer 112, 212 so that the first side 131, 231 and, particularly, the first sidewall 133, 233 is adjacent to the end 127, 227 of the first segment 121, 221. For example, the trench 130, 230 can be positioned such that the end 127, 227 of the first segment 121, 221 is exposed in the lowermost portion of the first sidewall 133, 233 at the bottom 135, 235 of the trench 130, 230.

The second segment 122, 222 of the optical waveguide 120, 220 can extend from the first level up to and onto a higher second level. Specifically, the second segment 122, 222 of the optical waveguide 120, 220 can have opposing ends 128-129, 228-229 and two continuous portions (i.e., a first portion 123, 223 and a second portion 124, 224) that extend between the two opposing ends 128-129. The second segment 122, 222 can comprise a second light-transmissive body comprising at least one light-transmissive material. For example, the second segment 122, 222 can comprise the same light-transmissive material(s) as the first segment 121, 221. The second segment 122, 222 can have an essentially the same cross-sectional shape (e.g., an essentially rectangular cross-sectional shape, such as a square cross-sectional shape, or, alternatively, an essentially circular cross-sectional shape) and cross-sectional area as the first segment 121, 221.

The first portion 123, 223 of the second segment 122, 222 can be within the trench 130, 230 with an end 128, 228 at the bottom 135, 235 on the first side 131, 231 such that it is adjacent to the first sidewall 133, 233 and, particularly, such that it is adjacent to the end 127, 227 of the first segment 121, 221. That is, the first portion 123, 223 of the second segment 122, 222 can be in end-to-end alignment with the first segment 121, 221. The first portion 123, 223 can further be positioned immediately adjacent to (i.e., in contact with) the first segment 121, 221 (i.e., the adjacent ends 127, 227 and 128, 228 of the first segment 121, 221 and of the first portion 123, 223 of the second segment 122, 222, respectively, can meet). Alternatively, the first portion 123, 223 can be separated from, but less than a predetermined distance 195, 295 from, the first segment 121, 222 (i.e., the adjacent ends 127, 227 and 128, 228 of the first segment 121, 221 and of the first portion 123, 223 of the second segment 122, 222, respectively, can be spaced no more than a predetermined distance 195, 295 apart). This predetermined distance 195, 295 can be the maximum separation distance allowable for light to propagate between the first segment 121, 221 and the second segment 122, 222. Those skilled in the art will recognize that this maximum separation distance will vary depending upon a variety of factors including, but not limited to, the materials used, the cross-sectional area of the segments, the frequency of the light signals, etc. The first portion 123, 223 of the second segment 122, 222 can further extend from the bottom 135, 235 of the trench 130, 230 on the first side 131, 231 across the trench 130, 230 to the second side 132, 232 and, particularly, up to the top surface 182, 282 of the second dielectric layer 112, 212 on the second side 132, 232 of the trench 130, 230 (i.e., up to the top of the trench 130, 230 on the second side 132, 232).

Specifically, as shown in the optoelectronic structure 100 of FIG. 1, this first portion 123 of the second segment 122 can line (i.e., can be positioned immediately adjacent to) a portion of the first dielectric layer 111 exposed at the bottom 135 of the trench 130 and can extend laterally from adjacent to the first sidewall 133 to the second sidewall 134. This first portion 123 can further line (i.e., can be positioned immediately adjacent to) the second sidewall 134 on the second side 132 of the trench 130 and can extend along the second sidewall 134 from the bottom 135 of the trench 130 to the top surface 182 of the second dielectric layer 112 (i.e., to the top of the trench 130 on the second side 132). Alternatively, as shown in the optoelectronic structure 200 of FIG. 2, the first portion 223 of the second segment 222 can extend laterally from the bottom 235 of the trench 230 adjacent to the first sidewall 233 toward the second sidewall 234 and can curve upward from the bottom 235 of the trench 230 toward the top surface 282 of the second dielectric layer 212. This upward curve can begin some distance away from the second sidewall 234 (e.g., at some point near the center of the trench 230) such that the distance between the first portion 223 and the second sidewall 234 tapers from the bottom 235 of the trench 230 to the top surface 282 of the second dielectric layer 212.

In any case, the second portion 124, 224 of the second segment 122, 222 of the optical waveguide 120, 220 can be continuous with the first portion 123, 223 and can extend over the edge of the trench 130, 230 on the second side 132, 232 onto the top surface 182, 282 of the second dielectric layer 112, 212 (i.e., onto the higher second level). This second portion 124, 224 can further extend laterally away from that second side 132, 232 of the trench 130, 230. The second portion 124, 224 can further have an end 129, 229 positioned adjacent to any one of an on-chip optical device at the same level or a port to an off-chip optical device (not shown). This second portion 124, 224 of the second segment 122, 222 can be essentially linear, as illustrated. Alternatively, this second portion 124, 224 of the second segment 122, 222 can be angled or curved. It should be noted that any angles or curves should be wide enough to allow for light signal propagation through the second segment 122, 222.

It should be noted that in the optoelectronic structures 100 and 200 of FIGS. 1 and 2, respectively, the first sidewall 133, 233 and the second sidewall 134, 234 could be angled (i.e., sloped) relative to the bottom surface 181, 281 and top surface 182, 282 of the second dielectric layer 112, 212. Specifically, in the case of the optoelectronic structure 100 of FIG. 1, wherein the first portion 123 of the second segment 122 lines the bottom 135 and the second sidewall 134 of the trench 130 (i.e., wherein the shape of the first portion 123 is defined by the profile of the trench 130), the sidewalls should be angled (as opposed to being normal (i.e., perpendicular)) relative to the bottom surface 181 and the top surface 182 of the second dielectric layer 112. Furthermore, the angle of the second sidewall 134 of the trench 130 relative to the bottom and top surfaces 181-182 of the second dielectric layer 112 should be wide enough (e.g., greater than 90°, between 120° and 170°, etc.) to allow for continued propagation of light signals through the curves in the first portion 123 both in the bottom 135 of the trench 130 and around the edge of the trench 130 at the top surface 182 of the second dielectric layer 112. In the case of the optoelectronic structure 200 of FIG. 2, the first and second sidewalls 233-234 can be angled (i.e., sloped) relative to bottom and top surfaces 281-282; however, since the first portion 223 of the second segment 222 is not self-aligned with the second sidewall 234 (i.e., since the shape of the first portion 223 is not defined by the profile of the trench 230), the first and second sidewalls 233-234 can, alternatively, be perpendicular to the bottom and top surfaces 281-282 of the second dielectric layer 212, curved, etc.

The optoelectronic structure 100, 200 can further comprise a third dielectric layer 113, 213 positioned on the top surface 182, 282 of the second dielectric layer 112, 212, covering the second portion 124, 224 of the second segment 122, 222 of the optical waveguide 120, 220. This third dielectric layer 113, 213 can also fill the trench 130, 230 so as to also cover (and surround, if applicable, as illustrated in FIG. 2) the first portion 123, 223 of the second segment 122, 222 of the optical waveguide 120, 220 contained within the trench 130, 230.

As mentioned above, the first segment 121, 221 and the second segment 122, 222 of the optical waveguide 120, 220 can have specific refractive indices and, if the light-transmissive material(s) used are the same, the refractive indices will be the same. Furthermore, to ensure proper transmission of light signals through the optical waveguide 120, 220, the refractive indices of the first segment 121, 221 and the second segment 122, 222, which function as the core, must be higher than the refractive indices of surrounding dielectric material (i.e., which functions as the cladding). That is, the first segment 121, 221 and second segment 122, 222 can each comprise light-transmissive material(s) (e.g., light-transmissive dielectric materials) with a higher refractive index than the first dielectric layer 111, 211, the second dielectric layer 112, 212 and the third dielectric layer 113, 213.

Optionally, the first dielectric layer 111, 211, the second dielectric layer 112, 212, the third dielectric layer 113, 213 and/or any additional dielectric layers 114, 214 can comprise different dielectric materials. For example, the first dielectric layer 111, 211 can comprise a first dielectric material and the second dielectric layer 112, 212 can comprise a second dielectric material, which is different from the first dielectric material and which, during processing and, particularly during trench formation, can be selectively etched over the first dielectric material (see the more detailed discussion below with regard to the methods). Furthermore, the second dielectric layer 112, 212, the third dielectric layer 113, 213 and the additional dielectric layer(s) 114, 214 can comprise the same dielectric material or different dielectric materials.

Therefore, in one exemplary optoelectronic structure 100, 200, the first dielectric layer 111, 211 can comprise silicon nitride, having a refractive index of approximately 2; the second dielectric layer 112, 212, third dielectric layer 113, 213 and an additional dielectric layer 114, 214 between the substrate 101, 201 and the first dielectric layer 111, 211 can comprise silicon dioxide, having a refractive index of approximately 1.5; and, the first segment 121, 221 and second segment 122, 222 of the optical waveguide 120, 220 can comprise silicon (Si) having a refractive index of approximately 3.5 or any of the following materials having appropriate refractive indices for the optical waveguide structures: phosphorous-doped and/or boron-doped silicon oxide, germanium-doped silicon oxide, silicon oxynitride (SiON), silicon germanium (SiGe), or any of various different light-transmissive polymers. It should be understood that the list of exemplary materials mentioned above is not intended to be limiting. Those skilled in the art will recognize that, alternatively, other material combinations suitable for use in optoelectronic structures and, particularly, suitable for use as core and cladding materials in optical waveguides could be used.

Also disclosed herein are methods for forming the above-described optoelectronic structures 100, 200 with multi-level optical waveguides 120, 220, as shown in FIGS. 1 and 2.

Figure 3:
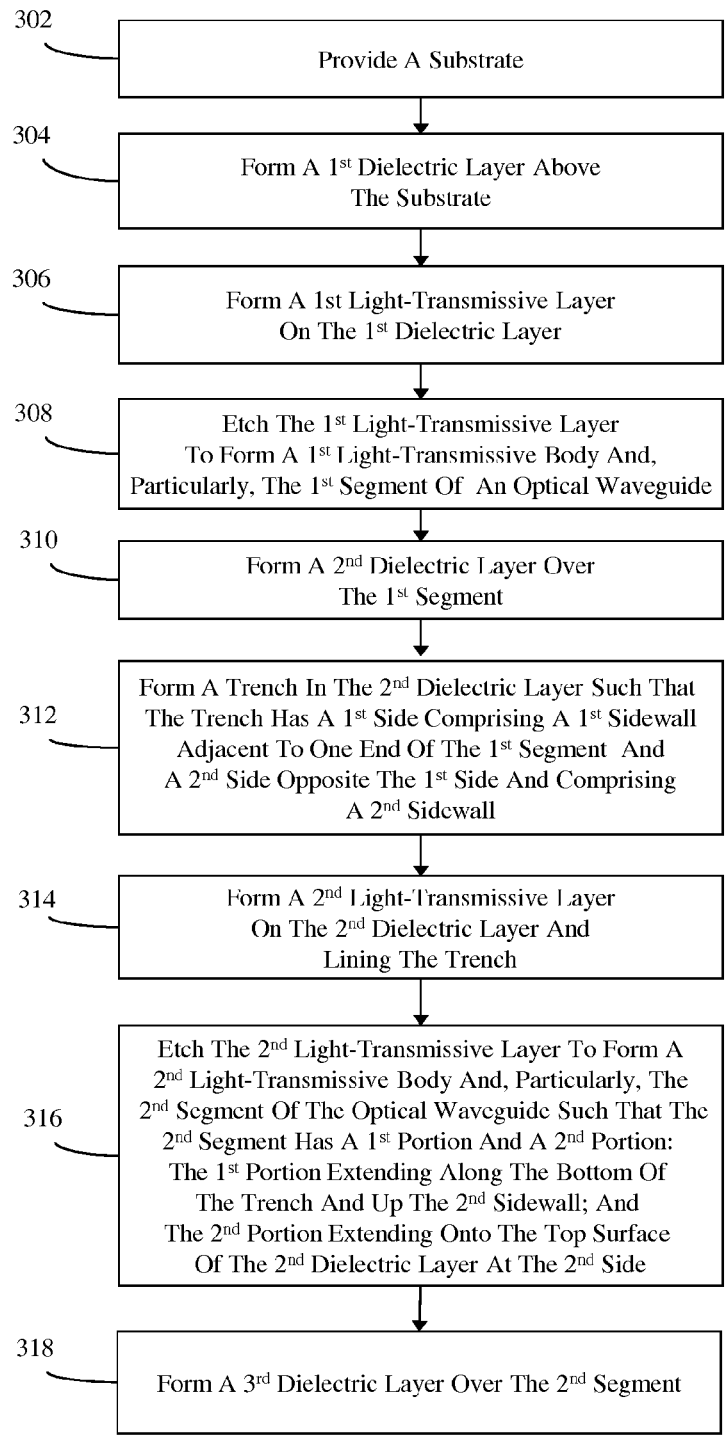
FIG. 3 is a flow diagram illustrating a method of forming the optoelectronic structure of FIG. 1.
Figure 4:
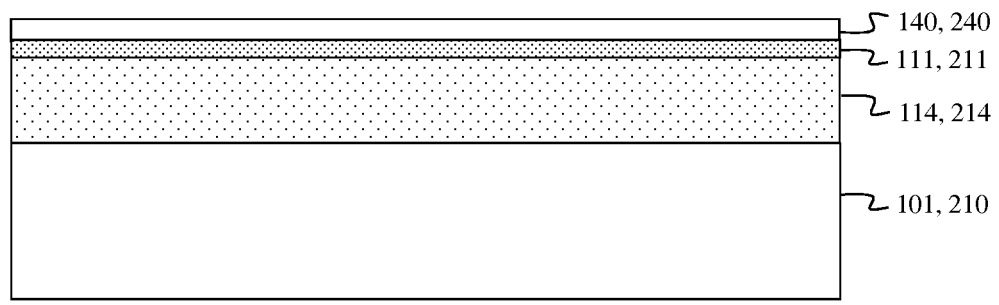
FIG. 4 is a cross-section diagram illustrating a partially completed optoelectronic structure formed according to the method of FIG. 3 above (or of FIG. 12 below)
Figure 5A:
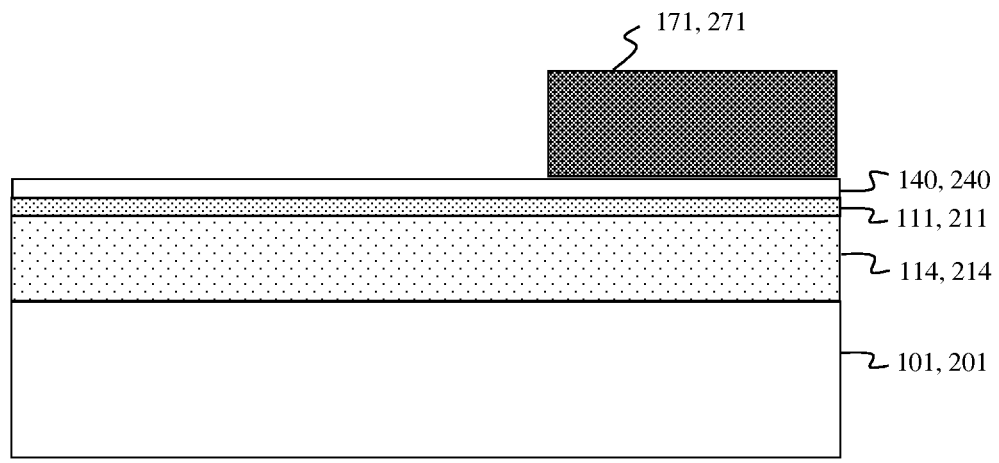
FIG. 5A is a cross-section diagram illustrating a partially completed optoelectronic structure formed according to the method of FIG. 3 above (or of FIG. 12 below)
Figure 5B:
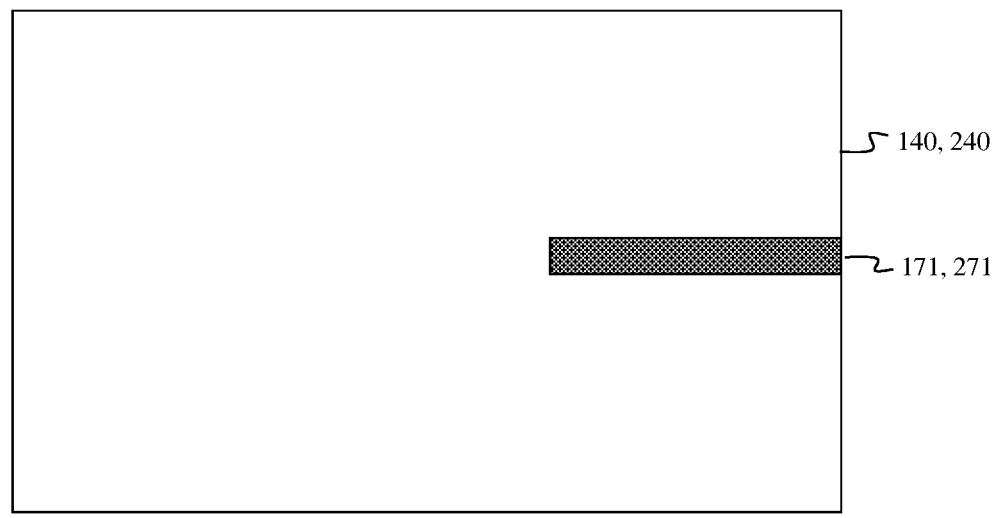
FIG. 5B is a top view diagram illustrating the same partially completed optoelectronic structure as shown in FIG. 5A.
Figure 6A:
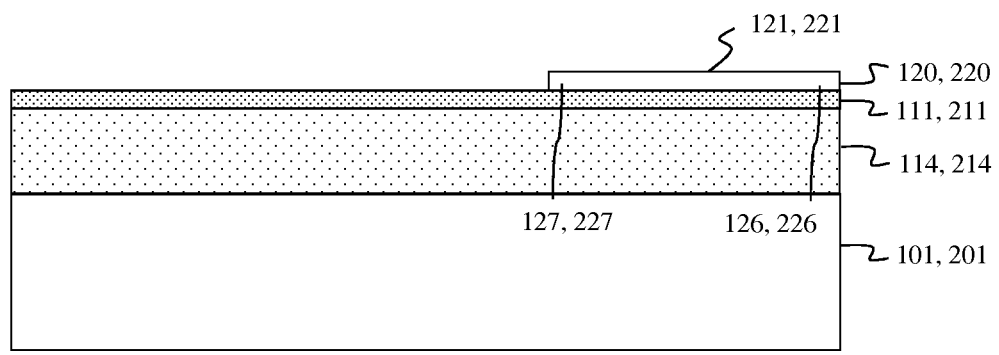
FIG. 6A is a cross-section diagram illustrating a partially completed optoelectronic structure formed according to the method of FIG. 3 above (or of FIG. 12 below)
Figure 6B:
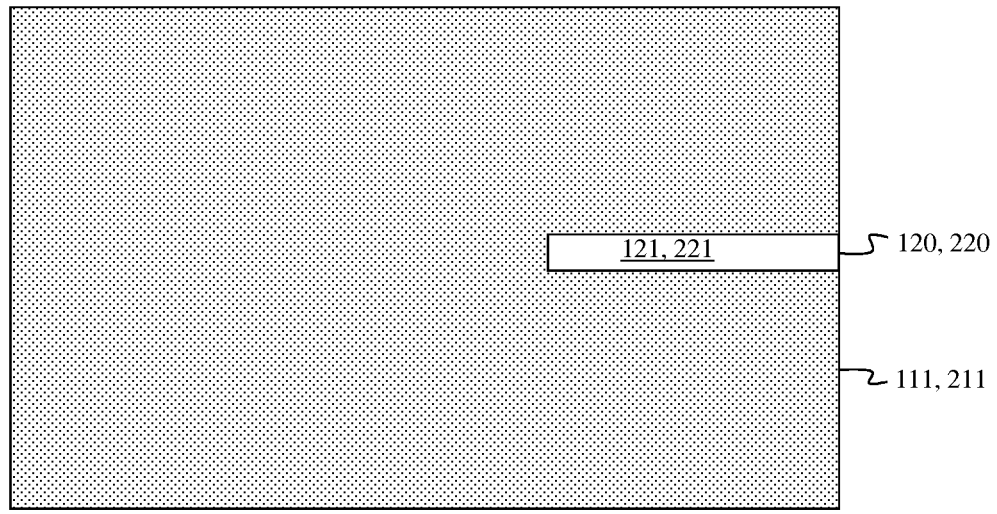
FIG. 6B is a top view diagram illustrating the same partially completed optoelectronic structure as shown in FIG. 6A.

Referring to the flow diagram of FIG. 3, one method of forming an optoelectronic structure 100 with a multi-level optical waveguide 120, as shown in FIG. 1, can comprise providing a substrate 101 (e.g., a semiconductor substrate, such as a silicon substrate, or any other suitable substrate) (302, see also FIG. 4).

A first dielectric layer 111 can be formed (e.g., deposited) above the substrate 101 and, optionally, this first dielectric layer 111 can be formed above one or more additional layers (e.g., additional dielectric layers 114) on the substrate 101 (304, see also FIG. 4). After the first dielectric layer 111 is deposited, an optional chemical-mechanical polishing (CMP) process may be performed in order to ensure that the top surface of the first dielectric layer 111 is essentially planar.

A first segment 121 of an optical waveguide 120 can be formed on the top surface of the first dielectric layer 111 (i.e., on a first level) (306-308, see also FIG. 4, FIGS. 5A-5B and FIGS. 6A-6B). Specifically, a first light-transmissive layer 140 can be formed (e.g., deposited) on the first dielectric layer 111 (306, see also FIG. 4). This first light-transmissive layer 140 can comprise at least one transmissive material (e.g., a light-transmissive dielectric material) having a specific refractive index. After the first light-transmissive layer 140 is deposited, an optional chemical-mechanical polishing (CMP) process may be performed in order to ensure that the top surface of the first light-transmissive layer 140 is essentially planar and to further ensure that the first light-transmissive layer 140 and, thereby the first segment of the optical waveguide 120 will have a desired thickness (see detailed discussion below regarding the dimensions of the optical waveguide). A mask 171 can then be formed on the first light-transmissive layer 140 (e.g., using conventional photolithographic patterning techniques) (see FIGS. 5A-5B) and exposed portions of the first light-transmissive layer 140 can be etched away to form a first light-transmissive body and, particularly, the first segment 121 of the optical waveguide 120 (308, see also FIGS. 6A-6B).

It should be noted that these process 306-308 should be performed such that the first segment 121 has an essentially rectangular cross-sectional shape (e.g., a square cross-sectional shape) with a predetermined cross-sectional area. These processes 306-308 can further be performed such that the first segment 121 has opposing ends 126-127, wherein one end 126 of the first segment 121 is, for example, adjacent to any one of an on-chip optical device on the same level or a port to an off-chip optical device (not shown). Additionally, these processes 306-308 can be performed such that the first segment 121 is essentially linear, as illustrated, or, alternatively, such that the first segment 121 is angled or curved. It should be noted that any angles or curves should be wide enough to allow for light signal propagation through the first segment 121.

Figure 7:
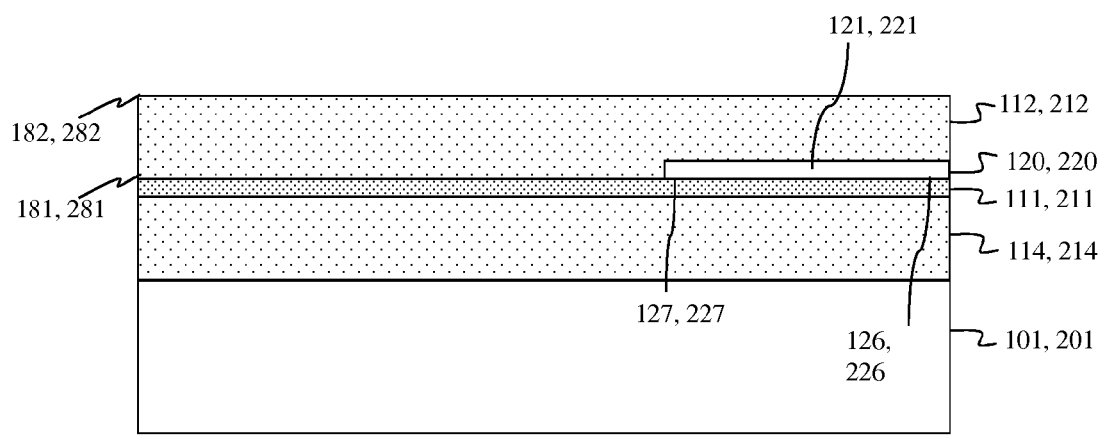
FIG. 7 is a cross-section diagram illustrating a partially completed optoelectronic structure formed according to the method of FIG. 3 above (or of FIG. 12 below)

After the first segment 121 of the optical waveguide 120 is formed on the first dielectric layer 111, the mask 171 can be selectively removed and a second dielectric layer 112 can be formed (e.g., deposited) on the first dielectric layer 111 so as to cover the first segment 121 (310, see also FIG. 7). Thus, the second dielectric layer 112 will have a bottom surface 181 adjacent to the first dielectric layer 111 and the first segment 121. This second dielectric layer 112 will further have a top surface 182 opposite the bottom surface 181. This second dielectric layer 112 can be preselected so that it comprises a different dielectric material than the first dielectric layer 111 and, particularly, so that it can be etched selectively over the first dielectric layer at process 312, discussed below. After the second dielectric layer 112 is deposited, an optional chemical-mechanical polishing (CMP) process may be performed in order to ensure that the top surface 182 of the second dielectric layer 112 is substantially planar and to further ensure that the second dielectric layer 112 has a desired thickness (see detailed discussion below regarding the dimensions of the optical waveguide).

Figure 8:
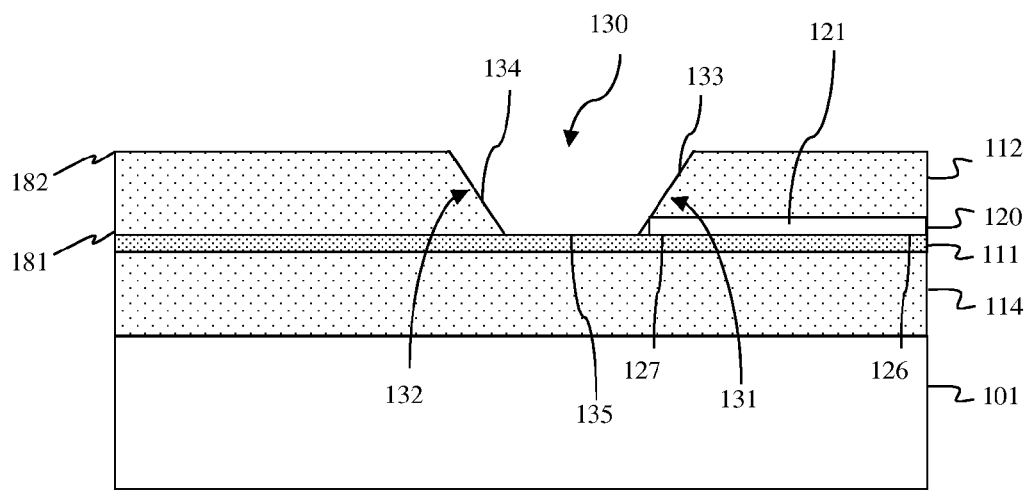
FIG. 8 is a cross-section diagram illustrating a partially completed optoelectronic structure formed according to the method of FIG. 3 above.
Figure 9:
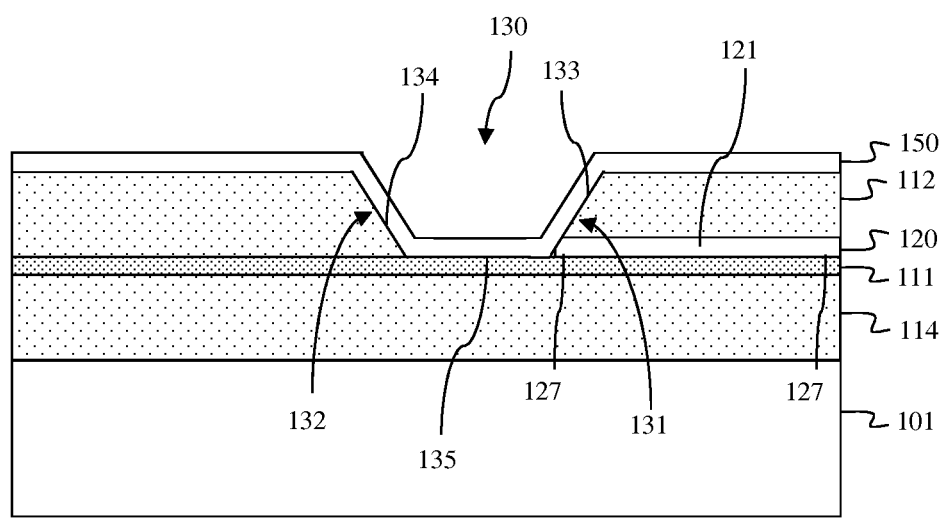
FIG. 9 is a cross-section diagram illustrating a partially completed optoelectronic structure formed according to the method of FIG. 3 above.
Figure 10A:
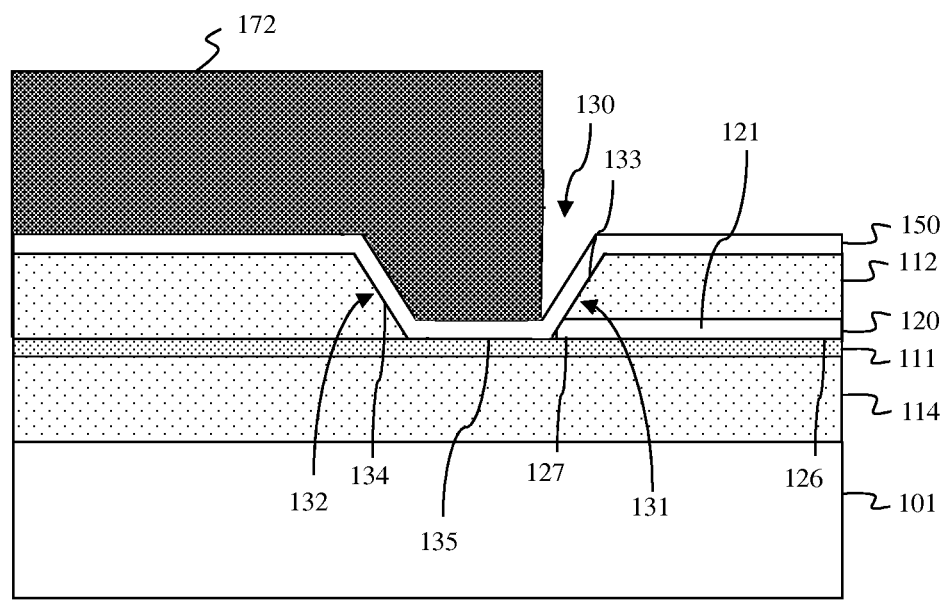
FIG. 10A is a cross-section diagram illustrating a partially completed optoelectronic structure formed according to the method of FIG. 3 above.
Figure 10B:
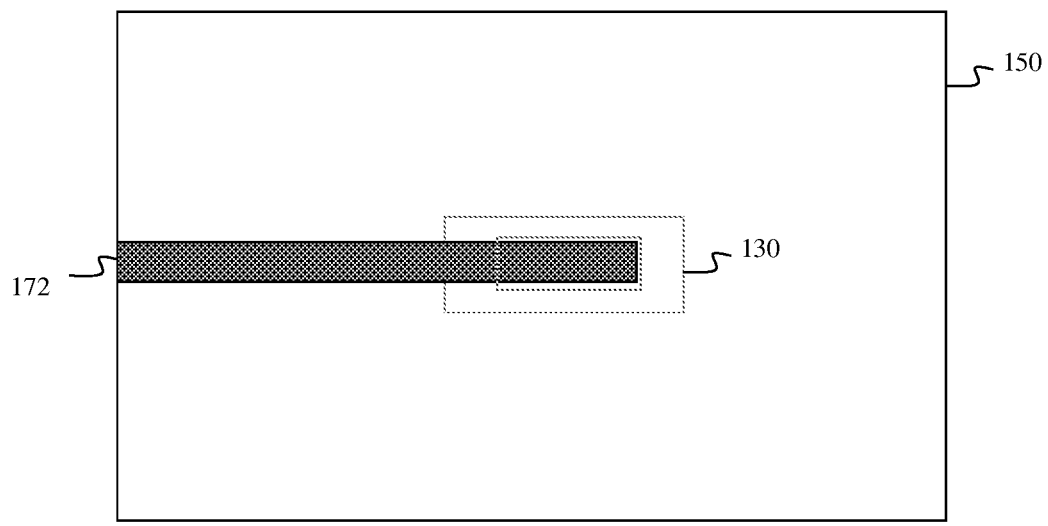
FIG. 10B is a top view diagram illustrating the same partially completed optoelectronic structure as shown in FIG. 10A.
Figure 11A:
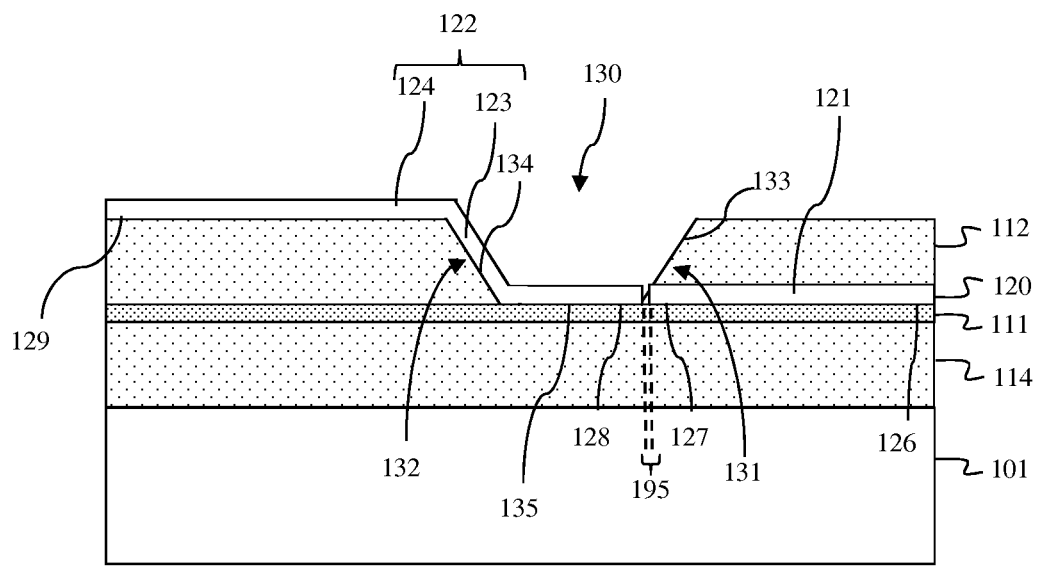
FIG. 11A is a cross-section diagram illustrating a partially completed optoelectronic structure formed according to the method of FIG. 3 above.
Figure 11B:
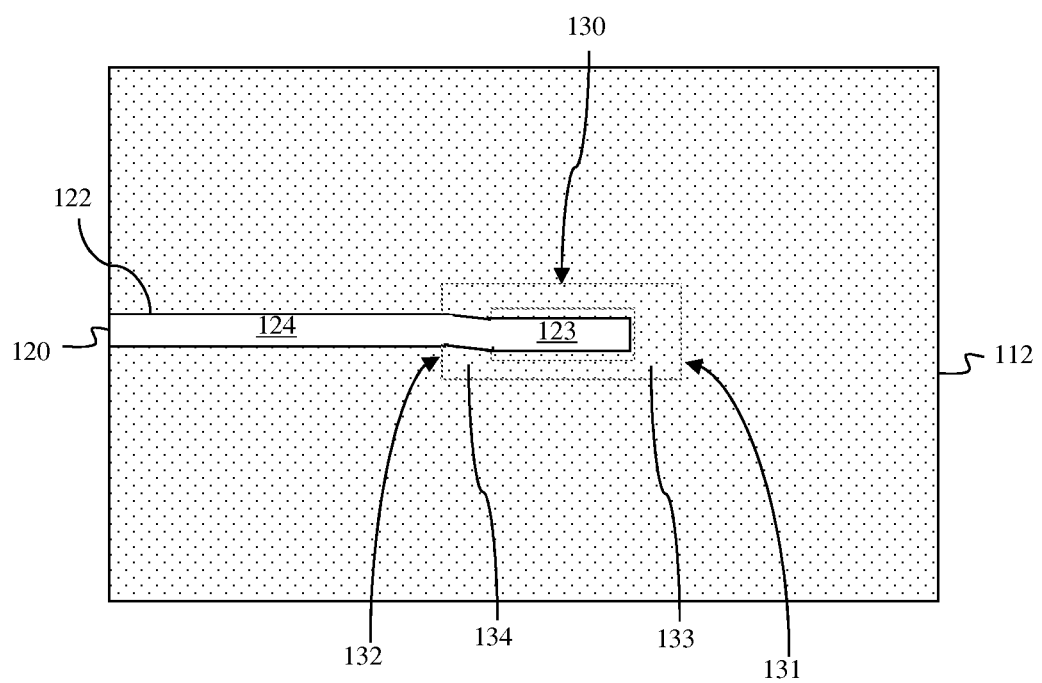
FIG. 11B is a top view diagram illustrating the same partially completed optoelectronic structure as shown in FIG. 11A.

A trench 130 can subsequently be formed in the second dielectric layer 112 such that it extends through the second dielectric layer 112 from the top surface 182 to the bottom surface 181 (312, see also FIG. 8). Specifically, a mask can be formed on the second dielectric layer 112 (e.g., using conventional lithographic patterning techniques) and an exposed portion of the second dielectric layer 112 can be etched. The mask patterning and etch processes can be performed such that the trench 130 extends to the first dielectric layer 111 (i.e., the first dielectric layer 111 functions as an etch stop layer) and such that the trench 130 has a first side 131 comprising a first sidewall 133 and a second side 132 opposite the first side 131 and comprising a second sidewall 134. The mask patterning and etch processes can further be performed such that the first side 131 of the trench 130 and, particularly, the first sidewall 133 is adjacent to one end 127 of the first segment 121. For example, the mask patterning and etch processes can be performed so that one end 127 of the first segment 121 is exposed at the lowermost portion of the first sidewall 133 at the bottom 135 of the trench 130. Additionally, the mask patterning and etch processes can be performed such that the first and second sidewalls 133-134 are angled (i.e., sloped) relative to the bottom and top surfaces 181-182 of the second dielectric layer 112, as opposed to being normal (i.e., perpendicular) relative thereto (see more detailed discussion below).

After the trench 130 is formed, a second segment 122 of the optical waveguide 120 can be formed such that it extends from the first level on the first dielectric layer 111 adjacent to the first segment 121 up through the trench 130 and onto a higher second level and, particularly, onto the top surface 182 of the second dielectric layer 112 (314-316, see also FIG. 9, FIGS. 10A-10B and FIGS. 11A-11B). Specifically, after forming the trench 130, a second light-transmissive layer 150 can be formed (e.g., conformally deposited) on the top surface 182 of the second dielectric layer 112 and lining the bottom 135 and sidewalls 133-134 of the trench 130 (314 also FIG. 9). The second light-transmissive layer 150 can comprise at least one light-transmissive material having a specific refractive index. For example, the second light-transmissive layer 150 can comprise the same light-transmissive material(s) as used in forming the first segment 121. A mask 172 can then be formed on the second light-transmissive layer 150 (e.g., using conventional lithographic patterning techniques) (see FIGS. 10A-10B) and an exposed portion of the second light-transmissive layer 150 can be etched to form a second light-transmissive body and, particularly, the second segment 122 of the optical waveguide 120, wherein the second segment 122 can have essentially the same cross-sectional shape and size (i.e., the same cross-sectional area) as the first segment 121 (316, see also FIGS. 11A-11B). The processes 314-316 can be performed such that the second segment 122 comprises opposing ends 128-129 with one end 128 being adjacent to the end 127 of the first segment 121 on the first level and another end 129 on the second level and such that the second segment 122 comprises two continuous portions (i.e., a first portion 123 and a second portion 124) between the opposing ends 128-129.

Specifically, with regard to the first portion 123 of the second segment 122 of the optical waveguide 120, the processes 314-316 can further be performed such that the first portion 123 has an end 128, which is in the trench 130 at the bottom 135 on the first side 131 adjacent to the end 127 of the first segment 121 (i.e., such that it is in end-to-end alignment with the first segment 121). These processes 314-316 can also be performed such that the first portion 123 is positioned immediately adjacent to (i.e., in contact with) the first segment 121 (i.e., such that adjacent ends 127 and 128 of the first segment 121 and of the first portion 123 of the second segment 122, respectively, meet). Alternatively, these processes 314-316 can be performed such that the first portion 123 is separated from, but less than a predetermined distance 195 from, the first segment 121 (i.e., such that adjacent ends 127 and 128 of the first segment 121 and of the first portion 123 of the second segment 122, respectively, are spaced no more than a predetermined distance 195 apart). This predetermined distance 195 can be the maximum separation distance allowable for light to propagate between the segments. Those skilled in the art will recognize that this maximum separation distance will vary depending upon a variety of factors including, but not limited to, the materials used, the cross-sectional area of the segments, the frequency of the light signals, etc. The processes 314-316 can further be performed such that the first portion 123 lines (i.e., is positioned immediately adjacent to) the bottom 135 of the trench 130, extending laterally from adjacent to the first sidewall 133 to the second sidewall 134, and further lines (i.e., is positioned immediately adjacent to) the second sidewall 134 on the second side 132 of the trench 130, extending upward along the second sidewall 134 from the bottom 135 of the trench 130 to the top surface 182 of the second dielectric layer 112.

With regard to the second portion 124 of the second segment 122 of the optical waveguide 120, the processes 314-316 can be performed such that the second portion 124 is continuous with the first portion 123, extends over the edge on the second side 132 of the trench 130 onto the top surface 182 of the second dielectric layer 112 (i.e., onto the second level), and further extends laterally away from the trench 130 to, for example, an on-chip optical device on the same level or a port to an off-chip optical device (not shown) adjacent to the end 129 of the second segment 122. Furthermore, these processes 314-316 can be performed so that the second portion 124 is essentially linear, as illustrated, or, alternatively, so that the second portion 124, is angled or curved. It should be noted that any angles or curves should be wide enough to allow for light signal propagation through the second segment 122.

In any case, the processes 314-316 can be performed such that the second segment 122 has essentially the same cross-sectional shape (e.g., an essentially rectangular cross-sectional shape, such as a square cross-sectional shape) with the same predetermined cross-sectional area as the first segment 121.

It should be noted that in this method, since the first portion 123 of the second segment 122 lines the bottom 135 and the second sidewall 134 of the trench 130 (i.e., since the shape of the first portion 123 is defined by the profile of the trench 130), the trench 130 should be formed at process 312 such that the sidewalls 133-134 are angled, as opposed to being normal (i.e., perpendicular), relative to the bottom surface 181 and the top surface 182 of the second dielectric layer 112. Furthermore, the angle of the second sidewall 134 relative to the bottom and top surfaces 181-182 of the second dielectric layer 112 should be wide enough (e.g., greater than 90°, between 120° and 170°, etc.) to allow for continued propagation of light signals in the resulting optical waveguide 120 through the curves in the first portion 123 both in the bottom 135 of the trench 130 and around the edge of the trench 130 at the top surface 182 of the second dielectric layer 112. One exemplary technique for etching a trench with angled sidewalls in a dielectric layer, such as silicon dioxide, comprises a combination of short oxygen ($O_2$) ash steps and oxide etch steps. The oxygen ($O_2$) ash and oxide etch steps can be alternated in order to meet a desired angle of slope. It should be understood that this exemplary technique is provided for illustration purposes and is not intended to be limiting. Any other suitable technique for forming a trench with angled sidewalls in a dielectric layer could be used and the techniques may vary depending upon the dielectric material used.

After the second segment 122 is formed, the mask 172 can be selectively removed and a third dielectric layer 113 can formed (e.g., deposited) over the top surface 182 of the second dielectric layer 112 (318, see also FIG. 1). Specifically, the third dielectric layer 113 can be formed so that it covers the second portion 124 of the second segment 122 of the optical waveguide 120 on the top surface 182 of the second dielectric layer 112 and also so that it fills the trench 130, thereby covering the first portion 123 of the second segment 122 of the optical waveguide 120 contained within the trench 130. After the third dielectric layer 113 is deposited an optional chemical-mechanical polishing (CMP) step may be performed in order to ensure that the top surface of the third dielectric layer 113 is essentially planar.

As mentioned above, the first and second segments 121-122 of the optical waveguide 120 can have specific refractive indices and, if the light-transmissive material(s) used to form the two discrete segments at processes 306-316 are the same, the refractive indices will be the same. Furthermore, to ensure proper transmission of light signals through the resulting optical waveguide 120, the refractive indices of the first and second segments 121-122, which function as the core of the optical waveguide 120, must be higher than the refractive indices of the surrounding dielectric material (i.e., which function as the cladding of the optical waveguide 120). That is, the first and second segments 121-122 should be formed so that they comprise light-transmissive material(s) (e.g., light-transmissive dielectric materials) with a higher refractive index than the first dielectric layer 111, the second dielectric layer 112 and the third dielectric layer 113.

Optionally, the first dielectric layer 111 formed at process 304, the second dielectric layer 112 formed at process 310, the third dielectric layer formed at process 318 and/or any additional dielectric layers (e.g., formed on the substrate 101 before formation of the first dielectric layer 111 or formed above the third dielectric layer 113) can comprise different dielectric materials. For example, the first dielectric layer 111 formed at process 304 can comprise a first dielectric material and the second dielectric layer 112 formed at process 310 can comprise a second dielectric material, which is different from the first dielectric material and which, during processing and, particularly during trench formation at process 312, can be selectively etched over the first dielectric material. Furthermore, the second dielectric layer 112 formed at process 310, the third dielectric layer 113 formed at process 318 and any additional dielectric layer(s) 114 can comprise the same dielectric material or different dielectric materials.

Therefore, in one exemplary method of forming the optoelectronic structure 100, the first dielectric layer 111 can comprise silicon nitride, having a refractive index of approximately 2; the second dielectric layer 112, third dielectric layer 113 and an additional dielectric layer 114 between the substrate 101 and the first dielectric layer 111 can comprise silicon dioxide, having a refractive index of approximately 1.5; and, the light-transmissive layers used to form the first segment 121 and second segment 122 can comprise silicon (Si) having a refractive index of approximately 3.5 or any of the following materials having appropriate refractive indices for the optical waveguides structures: phosphorous-doped and/or boron-doped silicon oxide, germanium-doped silicon oxide, silicon oxynitride (SiON), silicon germanium (SiGe), or any of various different light-transmissive polymers. It should be understood that the list of exemplary materials mentioned above is not intended to be limiting. Those skilled in the art will recognize that, alternatively, other material combinations suitable for use in optoelectronic structures and, particularly, suitable for use as core and cladding materials in optical waveguides could be used.

Figure 12:
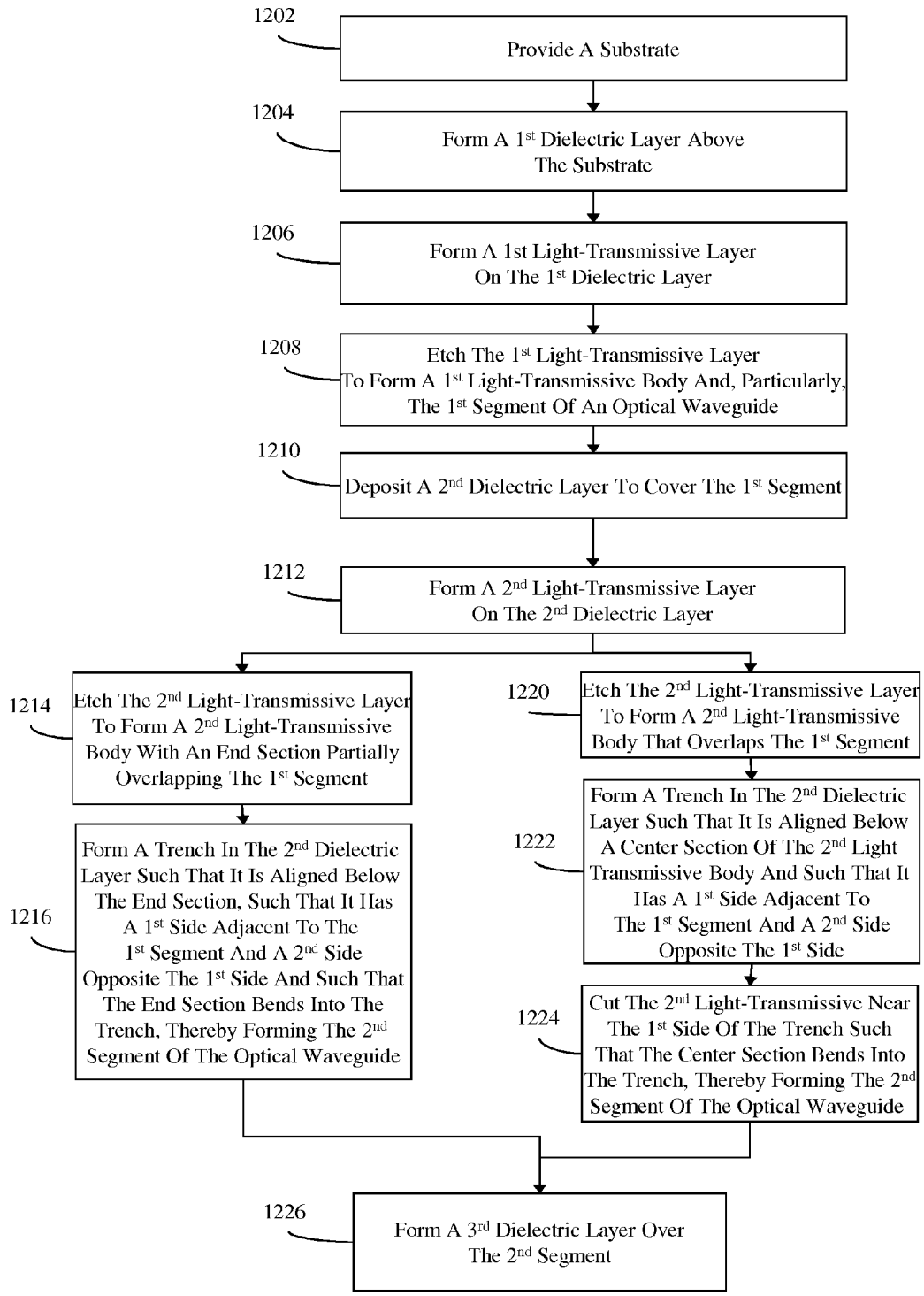
FIG. 12 is a flow diagram illustrating a method of forming the optoelectronic structure of FIG. 2.

Referring to the flow diagram of FIG. 12, methods of forming an optoelectronic structure 200 with a multi-level optical waveguide 220, as shown in FIG. 2, can comprise providing a substrate 201 (e.g., a semiconductor substrate, such as a silicon substrate, or any other suitable substrate) (1202, see also FIG. 4).

A first dielectric layer 211 can be formed (e.g., deposited) above the substrate 201 and, optionally, this first dielectric layer 211 can be formed above one or more additional layers (e.g., additional dielectric layers 214) on the substrate 201 (1204, see also FIG. 4). After the first dielectric layer 211 is deposited, an optional chemical-mechanical polishing (CMP) process may be performed in order to make the top surface of the first dielectric layer 211 essentially planar.

A first segment 221 of an optical waveguide 220 can be formed on the top surface of the first dielectric layer 211 (i.e., on a first level) (1206-1208, see also FIG. 4, FIGS. 5A-5B and FIGS. 6A-6B). Specifically, a first light-transmissive layer 240 can be formed (e.g., deposited) on the first dielectric layer 211 (1206, see also FIG. 4). This first light-transmissive layer 240 can comprise at least one transmissive material (e.g., a light-transmissive dielectric material) having a specific refractive index. After the first light-transmissive layer 240 is deposited, an optional chemical-mechanical polishing (CMP) process may be performed in order to ensure that the top surface of the first light-transmissive layer 240 is essentially planar and to further ensure that the first light-transmissive layer 240 and, thereby the first segment of the optical waveguide 220 has a desired thickness (see detailed discussion below regarding the dimensions of the optical waveguide). A mask 271 can then be formed on the first light-transmissive layer 240 (e.g., using conventional photo-lithographic patterning techniques) (see FIGS. 5A-5B) and exposed portions of the first light-transmissive layer 240 can be etched away to form a first light-transmissive body and, particularly, the first segment 221 of the optical waveguide 220 (1208, see also FIGS. 6A-6B).

It should be noted that these process 1206-1208 should be performed such that the first segment 221 has an essentially rectangular cross-sectional shape (e.g., a square cross-sectional shape) with a predetermined cross-sectional area. These processes 1206-1208 can further be performed such that the first segment 221 has opposing ends 226-227, wherein one end 226 of the first segment 221 is, for example, adjacent to any one of an on-chip optical device on the same level or a port to an off-chip optical device (not shown). Additionally, these processes 1206-1208 can be performed such that the first segment 221 is essentially linear, as illustrated, or, alternatively, such that the first segment 221 is angled or curved. It should be noted that any angles or curves should be wide enough to allow for light signal propagation through the first segment 221.

After the first segment 221 of the optical waveguide 220 is formed on the first dielectric layer 211, the mask 271 can be selectively removed and a second dielectric layer 212 can be formed (e.g., deposited) on the first dielectric layer 211 so as to cover the first segment 221 (1210, see also FIG. 7). Thus, the second dielectric layer 212 will have a bottom surface 281 adjacent to the first dielectric layer 211 and the first segment 221. This second dielectric layer 212 will further have a top surface 282 opposite the bottom surface 281. This second dielectric layer 212 can be preselected so that it comprises a different dielectric material than the first dielectric layer 211 and, particularly, so that it can be etched selectively over the first dielectric layer at process 1212, discussed below. After the second dielectric layer 212 is deposited, an optional chemical-mechanical polishing (CMP) process may be performed in order to ensure that the top surface 282 of the second dielectric layer 212 is essentially planar and to further ensure that the second dielectric layer 212 has a desired thickness (see detailed discussion below regarding the dimensions of the optical waveguide).

In these methods, a trench 230, as illustrated in FIG. 2, can be formed in the second dielectric layer 212 such that it extends from the top surface 282 to the bottom surface 281 of the second dielectric layer 212 and such that it has a first side 231 comprising a first sidewall 233 and a second side 232 opposite the first side 231 and comprising a second sidewall 234. This trench 230 can specifically be formed such that the first sidewall 233 is adjacent to one end 227 of the first segment 221. For example, this trench 230 can be formed such that one end 227 of the first segment 221 is exposed at the lowermost portion of the first sidewall 233 at the bottom 235 of the trench 230. Additionally, a second segment 222 of the optical waveguide can be formed such that it comprises opposing ends 228-229 and two continuous portions (i.e., a first portion 223 and a second portion 224) between the opposing ends 228-229. Specifically, the second segment 222 can be formed such that the first portion 223 extends through the trench 230 from the first level to a higher second level and, particularly, such that the first portion 223 has the end 228 at the bottom 235 of the trench 230 adjacent to the first segment 221 on the first side 231 and further curves upward from the bottom 235 of the trench 230 to the top surface 282 of the second dielectric layer 212 such that the distance between the first portion 223 and the second sidewall 234 tapers from the bottom 235 of the trench 230 to the top surface 282 of the second dielectric layer 212. The second segment 222 can further be formed such that the second portion 224 is continuous with the first portion 223, extends over the edge on the second side 232 of the trench 230 onto the top surface 282 of the second dielectric layer 212 (i.e., onto the second level), and further extends laterally away from the trench 230 to, for example, an on-chip optical device on the same level or a port to an off-chip optical device (not shown) adjacent to the end 229 of the second segment 222.

Figure 13:
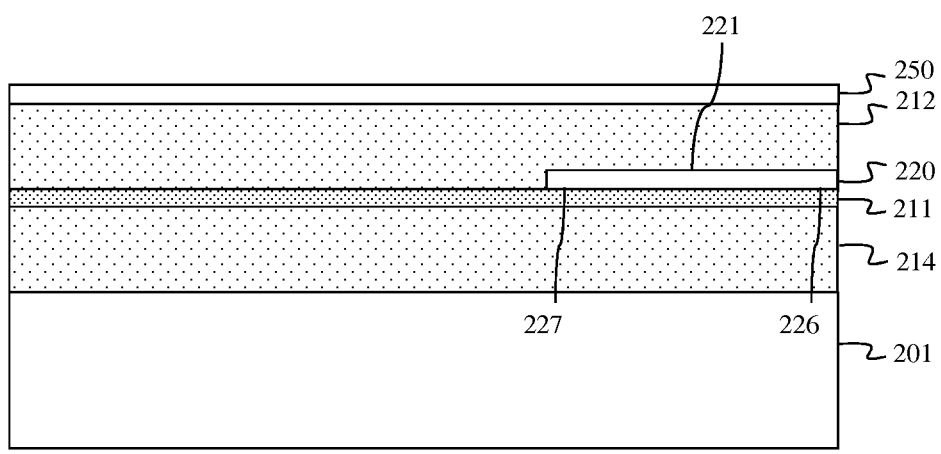
FIG. 13 is a cross-section diagram illustrating a partially completed optoelectronic structure formed according to the method of FIG. 12 above.

More specifically, in order to form such a second segment 222, before the trench is formed, a second light-transmissive layer 250 can be formed (e.g., deposited) on the second dielectric layer 212 (1212, see also FIG. 13). The second light-transmissive layer 250 can comprise at least one light-transmissive material having a specific refractive index. For example, the second light-transmissive layer 250 can comprise the same light-transmissive material(s) as used in forming the first segment 221. After the second light-transmissive layer 250 is deposited, an optional chemical-mechanical polishing (CMP) process may be performed in order to ensure that the top surface of the second light-transmissive layer 250 is essentially planar and to further ensure that the second light-transmissive layer 250 and, thereby the second segment of the optical waveguide 220 will have a desired thickness (see detailed discussion below regarding the dimensions of the optical waveguide). The second light-transmissive layer 250 can subsequently be etched to form a second light-transmissive body 251, which has essentially the same cross-sectional shape (e.g., an essentially rectangular cross-sectional shape, such as a square cross-sectional shape) with the same predetermined cross-sectional area as the first segment 221. The different methods for forming the optoelectronic structure 200 of FIG. 2 disclosed herein vary with regard to the length of this second light-transmissive body.

Figure 14A:
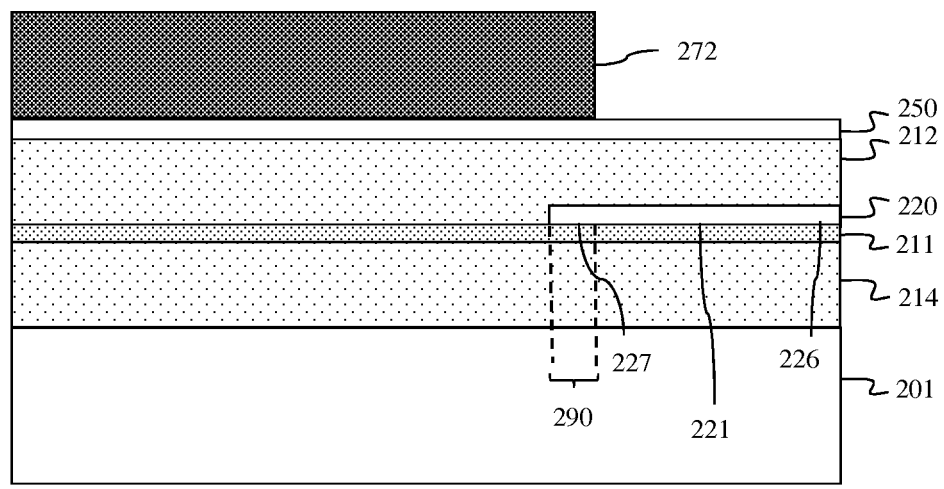
FIG. 14A is a cross-section diagram illustrating a partially completed optoelectronic structure formed according to the method of FIG. 12 above.
Figure 14B:
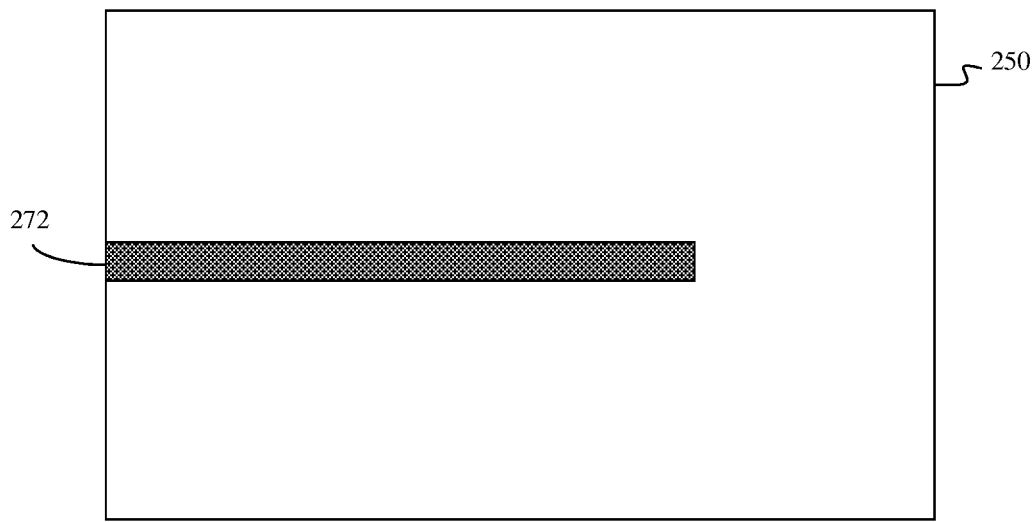
FIG. 14B is a top view diagram illustrating the same partially completed optoelectronic structure as shown in FIG. 14A.
Figure 15A:
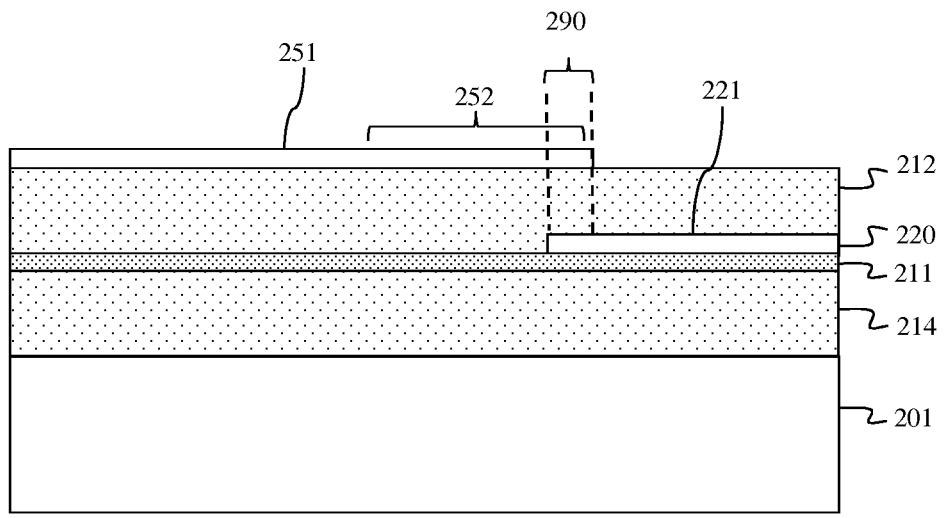
FIG. 15A is a cross-section diagram illustrating a partially completed optoelectronic structure formed according to the method of FIG. 12 above.
Figure 15B:
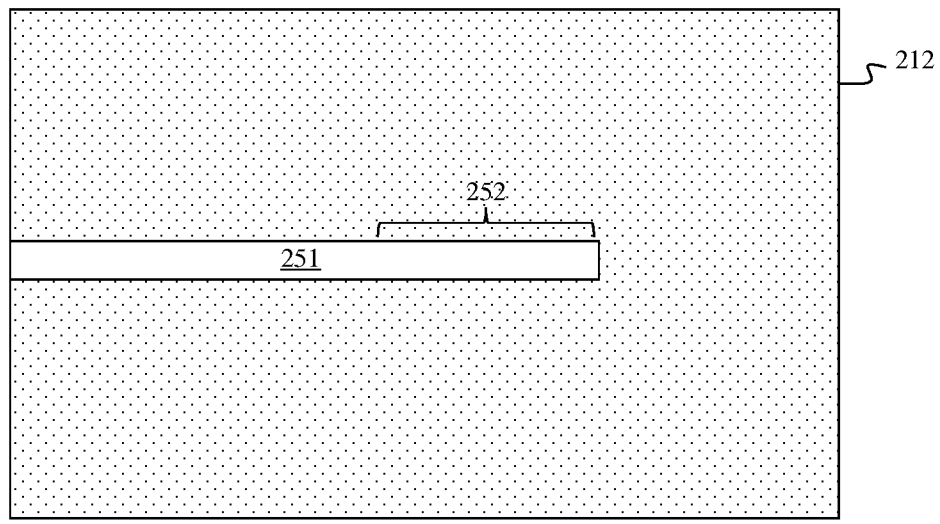
FIG. 15B is a top view diagram illustrating the same partially completed optoelectronic structure as shown in FIG. 15A.

For example, in one method, a mask 272 can then be formed on the second light-transmissive layer 250 (e.g., using conventional lithographic patterning techniques) (see FIGS. 14A-14B) and an exposed portion of the second light-transmissive layer 250 can be etched to the top surface 282 of the second dielectric layer 212 to form a second light-transmissive body 251, having essentially the same cross-sectional shape and the same cross-sectional area as the first segment 221 (1214, see also FIGS. 15A-15B). The mask patterning and etch processes can be performed such that the second light-transmissive body 251 has an end section 252 that partially overlays the end 227 of the first segment 221 by a specific distance 290. After the second light-transmissive body 251 is formed, the mask 272 can be selectively removed.

Figure 16:
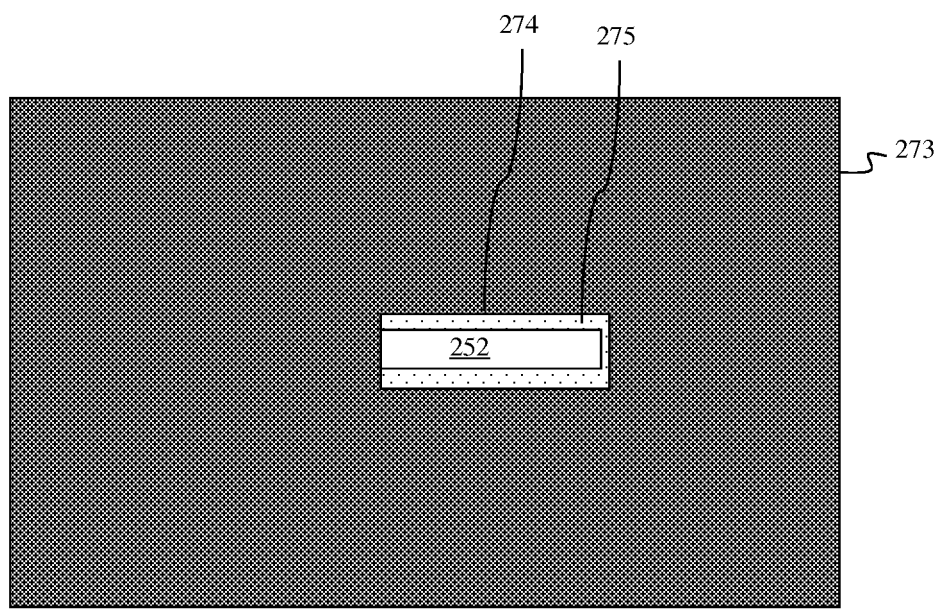
FIG. 16 is a top view diagram illustrating a partially completed optoelectronic structure formed according to the method of FIG. 12 above.
Figure 17:
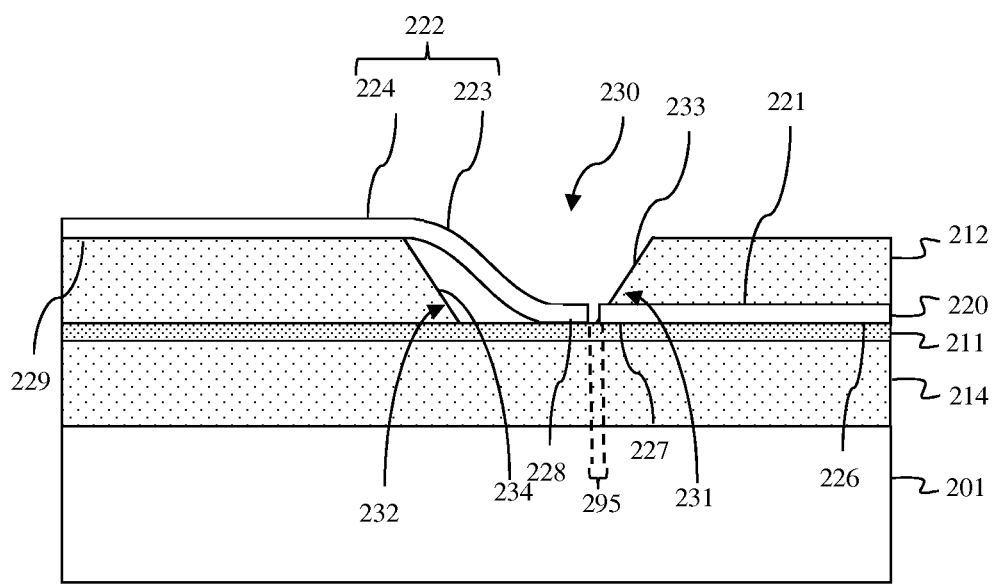
FIG. 17 is a cross-section diagram illustrating a partially completed optoelectronic structure formed according to the method of FIG. 12 above.

In this method, a trench 230 can then be formed in the second dielectric layer 212 so that it is aligned below the end section 252 of the second light-transmissive body 251 and adjacent to the end 227 of the first segment 221 (1216, see also FIG. 16 and FIG. 17). Specifically, a mask 273 can be formed (e.g., using conventional lithographic patterning techniques) on the second dielectric layer 212 and on the second light-transmissive body 251 with an opening 274 that exposes the end section 252 of the second light-transmissive body 251 as well as dielectric material 275 immediately adjacent to that end section 252 (see FIG. 16). Then, an etch process can be performed in order to remove dielectric material from below the end section 252 and to, thereby form a trench 230, which extends to the first dielectric layer 211 (i.e., the first dielectric layer 211 functions as an etch stop layer) and which has a first side 231 comprising a first sidewall 233 adjacent to the end 227 of the first segment 221 and a second side 232 opposite the first side 131 and comprising a second sidewall 234 (see FIG. 17). For example, the mask patterning and etch processes can be performed so that the end 227 of the first segment 221 is exposed at the lowermost portion of the first sidewall 233 at the bottom 235 of the trench 230. Additionally, the mask patterning and etch processes can be performed so that the first and second sidewalls 233-234 are angled (i.e., sloped) or curved relative to the bottom and top surfaces 281-282 of the second dielectric layer 212, as opposed to being normal (i.e., perpendicular) relative thereto. Exemplary etch processes that can be used can include, for example, a wet chemical hydrofluoric acid (HF)-based etch process or a dry reactive-ion etch (RIE) process. As a result, upon formation of the trench 230, the end section 252, which becomes unsupported, curves downward (i.e., bends downward) into the trench 230, thereby forming the second segment 222 of the optical waveguide 220, wherein the first portion 223 of the second segment 222 corresponds to the end section 252 of the second light-transmissive body 251, which is unsupported and which bends into the trench 230, and the second portion 224 of the second segment 222 corresponds to the supported section of the second light-transmissive body 251, which remains on the top surface 282 of the second dielectric layer 212 adjacent to the second side 232 of the trench 230.

It should be noted that, before the second light-transmissive body 251 is formed, specific dimensions of the second light-transmissive body 251 and the trench 230 should be determined to ensure that, when the trench 230 is formed and the unsupported end section 252 bends downward, the unsupported end section 252 lands on the bottom 235 of the trench 230 in end-to-end alignment with the first segment 221 either immediately adjacent to or at least less than a predetermined distance 295 from the end 227 of the first segment 221. The predetermined distance 295 can be the maximum separation distance allowable for light to propagate between the segments. Those skilled in the art will recognize that this maximum separation distance will vary depending upon a variety of factors including, but not limited to, the materials used, the cross-sectional area of the segments, the frequency of the light signals, etc. The dimensions can include, but are not limited to, the cross-sectional area of the second light-transmissive body 251, the width and height of the second light-transmissive body 251, the specific length of the end section 252 of the second light-transmissive body 251 that will be unsupported over the trench 230, the specific distance 290 by which the end section 252 will partially overlay the first segment 221, the length of the trench 230 and the depth of the trench 230 (i.e., the thickness of the second dielectric layer 212).

The following expressions can be used to estimate the deflection of the unsupported end section (i.e., the amount that the end section will bend once it becomes unsupported):

$$\Delta Z = \frac{Wl^3}{8EI}, \quad (1)$$

$$I = wd^3/12, \text{ and} \quad (2)$$

$$W = \rho wdlg, \quad (3)$$

where $\alpha Z$ is the deflection of the unsupported section (i.e., the amount of bend in the unsupported section), I is the second moment of inertia of the unsupported section, W is load on the unsupported section, E is Young's modulus, w is width of the unsupported section, d is thickness of the unsupported section, l is the length of the unsupported section, and g is standard gravity.

Figure 18:
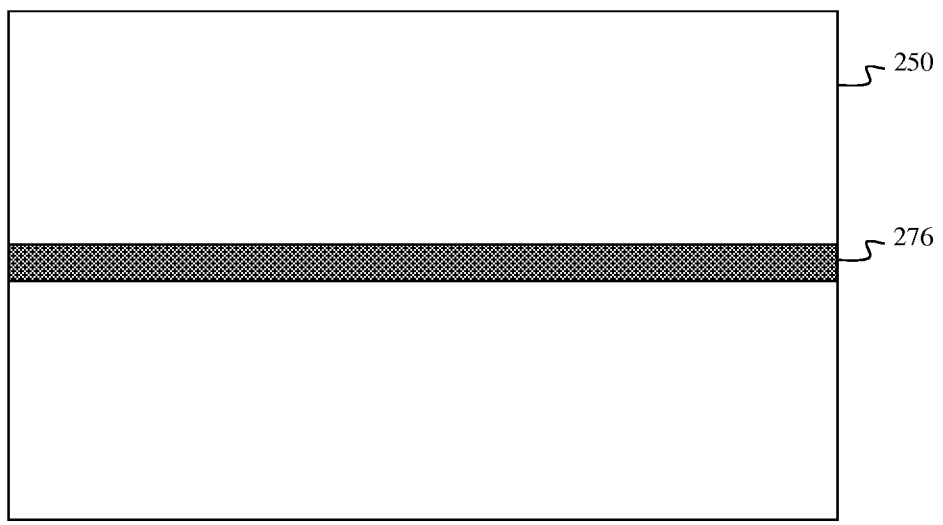
FIG. 18 is a top view diagram illustrating a partially completed optoelectronic structure formed according to the method of FIG. 12 above.
Figure 19:
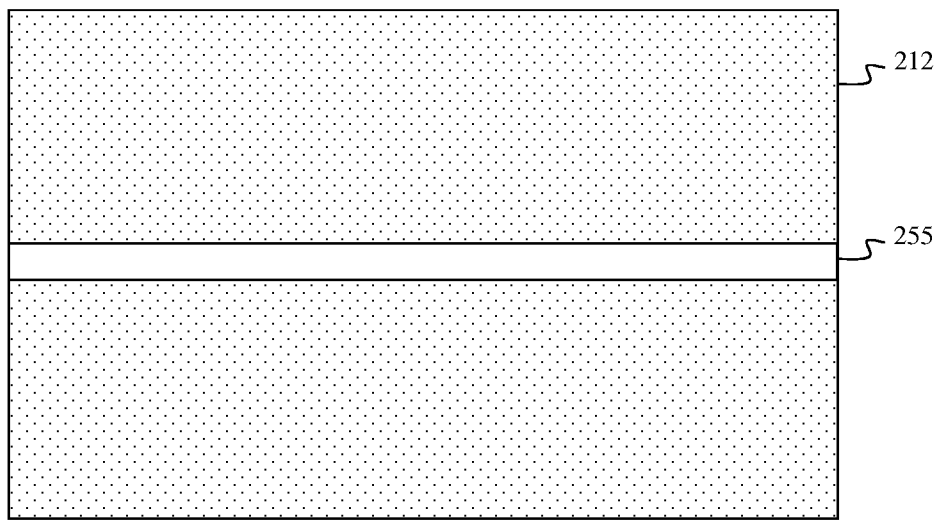
FIG. 19 is a top view diagram illustrating a partially completed optoelectronic structure formed according to the method of FIG. 12 above.

Alternatively, in another method, a mask 276 can be formed on the second light-transmissive layer 250 (e.g., using conventional lithographic patterning techniques) (see FIG. 18) and an exposed portion of the second light-transmissive layer 250 can be etched to the top surface 282 of the second dielectric layer 212 to form a second light-transmissive body 255, having essentially the same cross-sectional shape and cross-sectional area as the first segment 221 (1220, see also FIG. 19). The mask patterning and etch processes can be performed such that the second light-transmissive body 255 overlays the first segment 221. After the second light-transmissive body 255 is formed, the mask 276 can be selectively removed.

Figure 20:
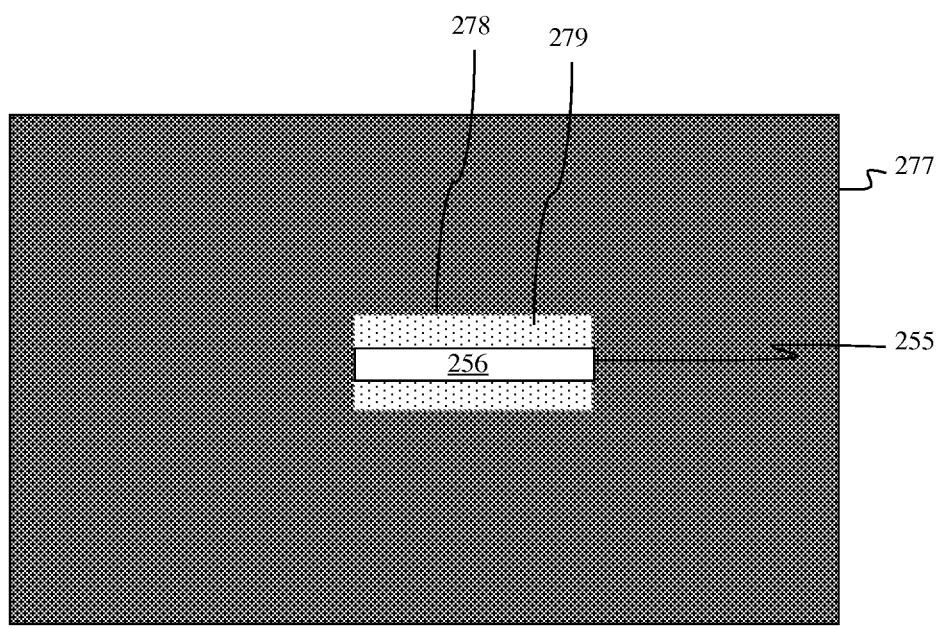
FIG. 20 is a top view diagram illustrating a partially completed optoelectronic structure formed according to the method of FIG. 12 above.
Figure 21A:
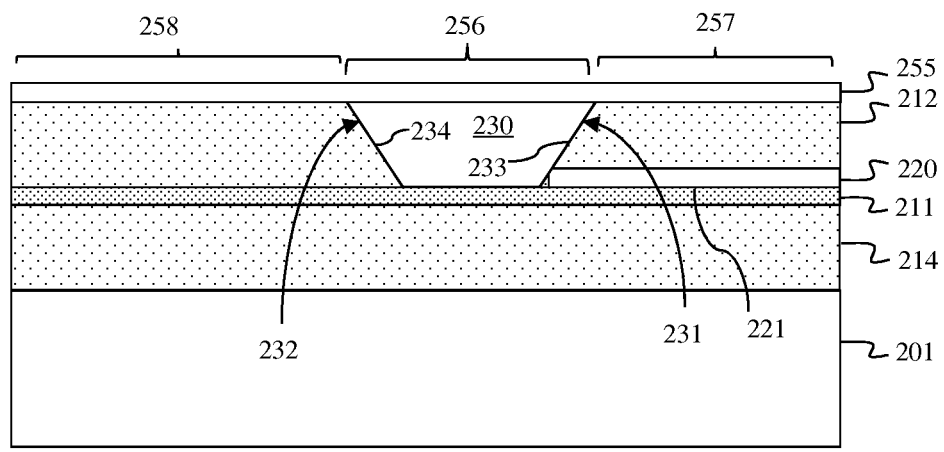
FIG. 21A is a cross-section diagram illustrating a partially completed optoelectronic structure formed according to the method of FIG. 12 above.
Figure 21B:
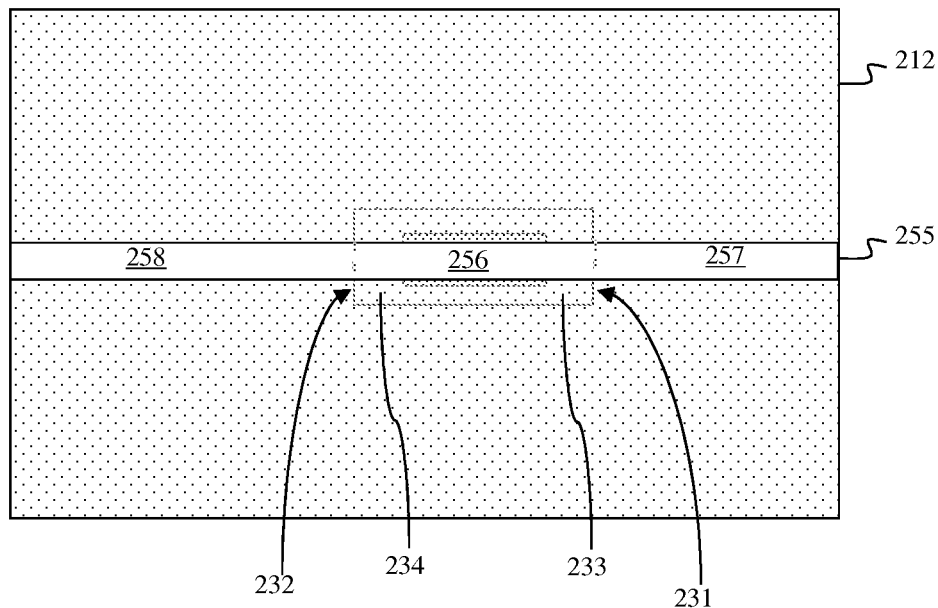
FIG. 21B is a top view diagram illustrating the same partially completed optoelectronic structure as shown in FIG. 21A.

In this method, a trench 230 can then be formed in the second dielectric layer 212 so that it is aligned below a center section 256 of the second light-transmissive body 255, which is offset from but adjacent to the end 227 of the first segment 221 (1222, see also FIG. 20 and FIGS. 21A-21B). Specifically, a mask 277 can be formed (e.g., using conventional lithographic patterning techniques) on the second dielectric layer 212 and on the second light-transmissive body 255 with an opening 278 that exposes the center section 256 of the second light-transmissive body 255 as well as dielectric material 279 immediately adjacent to that center section 256 (see FIG. 20). Then, an etch process can be performed in order to remove dielectric material from below the center section 256, thereby forming a trench 230, which extends to the first dielectric layer 211 (i.e., the first dielectric layer 211 functions as an etch stop layer) and which has a first side 231 comprising a first sidewall 233 adjacent to the end 227 of the first segment 221 and a second side 232 opposite the first side 231 and comprising a second sidewall 234 (see FIGS. 21A-21B). For example, the mask patterning and etch processes can be performed so that the end 227 of the first segment 221 is exposed at the lowermost portion of the first sidewall 233 at the bottom 235 of the trench 230. Additionally, the mask patterning and etch processes can be performed such that the first and second sidewalls 233-234 are angled (i.e., sloped) or curved relative to the bottom and top surfaces 281-282 of the second dielectric layer 212, as opposed to being normal (i.e., perpendicular) relative thereto. Exemplary etch processes that can be used can include, for example, a wet chemical hydrofluoric acid (HF)-based etch process or a dry reactive-ion etch (RIE) process. After the trench 230 is formed, the mask 277 can be selectively removed.

Figure 22:
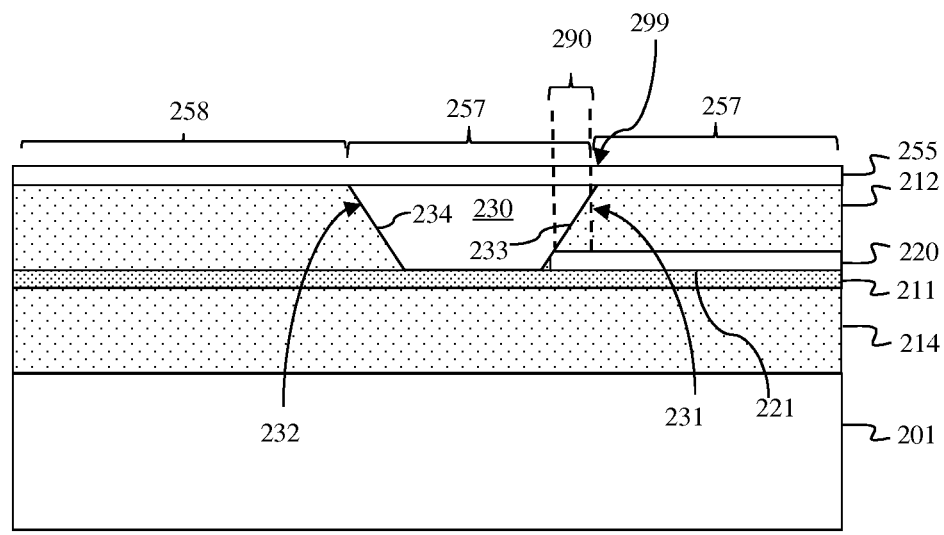
FIG. 22 is a cross-section diagram illustrating a partially completed optoelectronic structure formed according to the method of FIG. 12 above; and, FIG. 23 is a cross-section diagram illustrating a partially completed optoelectronic structure formed according to the method of FIG. 12 above.

In this case, after the trench 230 is formed, the center section 256 of the second light-transmissive body 255 remains supported by first and second end sections 257-258 remaining on the first and second sides 231-232, respectively, of the trench 230 (see FIG. 22). Thus, a cut can be made through the second light-transmissive body 255 at a specific location 299 near the first side 231 of the trench 230 such that the center section 256 becomes unsupported and, as a result, the center section 256 curves downward (i.e., bends) into the trench 230, thereby forming the second segment 222 of the optical waveguide 220, wherein the first portion 223 of the second segment 222 corresponds to the center section 256 of the second light-transmissive body 255, which bends into the trench 230, and the second portion 224 of the second segment 222 corresponds to the second end section 258 of the second light-transmissive body 255, which remains on the top surface 282 of the second dielectric layer 212 on the second side 232 of the trench 230 (1224, see also FIGS. 22-23 in combination).

It should be noted that, in this case before the second light-transmissive body 255 is cut, specific dimensions of the second light-transmissive body 255, the cut and the trench 230 as well as the specific location 299 of the cut should be determined to ensure that, when the trench 230 is formed and when the second light-transmissive body 255 is cut and the center section 256, which is now unsupported, bends downward, the center section 256 lands on the bottom 235 of the trench 230 in end-to-end alignment with the first segment 221 either immediately adjacent to or at least less than a predetermined distance 295 from the end 227 of the first segment 221. The predetermined distance 295 can be the maximum separation distance allowable for light to propagate between the segments. Those skilled in the art will recognize that this maximum separation distance will vary depending upon a variety of factors including, but not limited to, the materials used, the cross-sectional area of the segments, the frequency of the light signals, etc. The dimensions can include, but are not limited to, the cross-sectional area of the second light-transmissive body 251, the width and height of the second light-transmissive body 255, the specific length of the center section 256 of the second light-transmissive body 255 that will be unsupported over the trench 230, the specific distance 290 by which the center section 256 should overlay the first segment 221, the length of the trench 230 and the depth of the trench 230 (i.e., the thickness of the second dielectric layer 212). The expressions (1)-(3), discussed above, can similarly be used to estimate the deflection of the unsupported center section.

Figure 23:
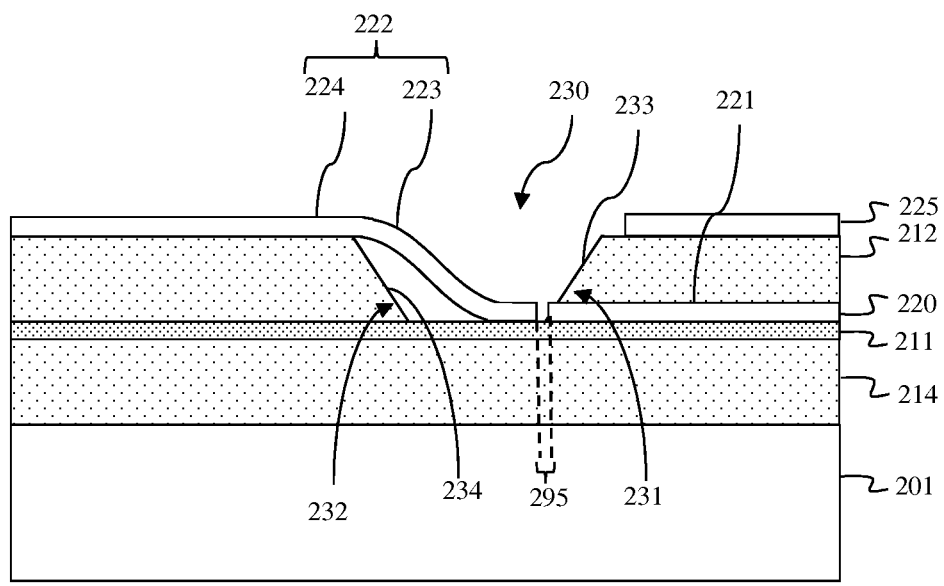

It should also be noted that the remaining portion 225 of the first end section 257 of the second light-transmissive body 255 (as shown in FIG. 23), which is separated from the center section 256 as a result of the cut and which remains on the second dielectric layer 212 at the first side 231 of the trench 230 above the first segment 221 of the optical waveguide 220, could be selectively removed. Alternatively, this remaining portion 225 of the first end section 257 can be incorporated into another single or multi-level waveguide.

In any case, after the second segment 222 is formed, a third dielectric layer 213 can formed (e.g., deposited) over the top surface 282 of the second dielectric layer 212 (1226, see also FIG. 2). Specifically, the third dielectric layer 213 can be formed so that it covers the second portion 224 of the second segment 222 of the optical waveguide 220 on the top surface 282 of the second dielectric layer 212 adjacent to the second side 232 of the trench 230 (and, if applicable, any remaining portion 225 the first end section 257 on the top surface 282 of the second dielectric layer 212 adjacent to the first side 231 of the trench 230) and also so that it fills the trench 230 and covers any exposed surfaces of the first portion 223 of the second segment 222 of the optical waveguide 220 contained within the trench 230. After the third dielectric layer 213 is deposited, an optional chemical-mechanical polishing (CMP) step may be performed in order to ensure that the top surface of the third dielectric layer 213 is essentially planar.

As mentioned above, the first and second segments 221-222 of the optical waveguide 220 can have specific refractive indices and, if the light-transmissive material(s) used to form the two discrete segments, as discussed above, are the same, the refractive indices will be the same. Furthermore, to ensure proper transmission of light signals through the resulting optical waveguide 220, the refractive indices of the first and second segments 221-222, which function as the core of the optical waveguide 220, must be higher than the refractive indices of the surrounding dielectric material (i.e., which functions as the cladding of the optical waveguide 220). That is, the first and second segments 221-222 should be formed so that they comprise light-transmissive material(s) (e.g., light-transmissive dielectric materials) with a higher refractive index than the first dielectric layer 211, the second dielectric layer 212 and the third dielectric layer 213.

Optionally, the first dielectric layer 211 formed at process 1204, the second dielectric layer 212 formed at process 1210, the third dielectric layer 213 formed at process 1226 and/or any additional dielectric layers (e.g., formed on the substrate 201 before formation of the first dielectric layer 211 or formed above the third dielectric layer 213) can comprise different dielectric materials. For example, the first dielectric layer 211 formed at process 1204 can comprise a first dielectric material and the second dielectric layer 1212 formed at process 1210 can comprise a second dielectric material, which is different from the first dielectric material and which, during processing and, particularly during trench formation at process 1216 or 1222 can be selectively etched over the first dielectric material. Furthermore, the second dielectric layer 212 formed at process 1210, the third dielectric layer 213 formed at process 1226 and any additional dielectric layer(s) 214 can comprise the same dielectric material or different dielectric materials.

Therefore, in one exemplary method of forming the optoelectronic structure 200, the first dielectric layer 211 can comprise silicon nitride, having a refractive index of approximately 2; the second dielectric layer 212, third dielectric layer 213 and an additional dielectric layer 214 between the substrate 101 and the first dielectric layer 211 can comprise silicon dioxide, having a refractive index of approximately 1.5; and, the light-transmissive layers used to form the first segment 221 and second segment 222 can comprise silicon (Si) having a refractive index of approximately 3.5 or any of the following materials having even higher refractive indices: phosphorous-doped and/or boron-doped silicon oxide, germanium-doped silicon oxide, silicon oxynitride (SiON), silicon germanium (SiGe), or any of various different light-transmissive polymers. It should be understood that the list of exemplary materials mentioned above is not intended to be limiting. Those skilled in the art will recognize that, alternatively, other material combinations suitable for use in optoelectronic structures and, particularly, suitable for use as core and cladding materials in optical waveguides could be used.

Each method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "on", "in direct contact", "abutting", "directly adjacent to", etc., are intended to indicate that at least one element physically contacts another element (without other elements separating the described elements). The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Therefore, disclosed above are optoelectronic structures, each having an optical waveguide comprising two discrete segments that provide a multi-level optical signal pathway on a chip. The optical waveguide can comprise a first segment at a first level and a second segment, which extends between the first level and a higher second level and which further extends along the second level. Specifically, the optical waveguide can comprise a first segment between a first dielectric layer and a second dielectric layer. A trench can extend through the second dielectric layer such that it has a first side positioned laterally adjacent to one end of the first segment and such that it has a second side opposite the first side. The optical waveguide can further comprise a second segment with a first portion and a second portion. The first portion can be within the trench and can extend from the first side on the bottom adjacent to the first segment up to the top on the second side. The second portion can be continuous with the first portion and can extend laterally onto the top surface of the second dielectric layer. A third dielectric layer can cover the second segment both in the trench and on the top surface of the second dielectric layer. Also disclosed herein are methods of forming such optoelectronic structures.

What is claimed is:
1. An optoelectronic structure comprising:
a first dielectric layer;
a first segment of an optical waveguide on said first dielectric layer;
a second dielectric layer on said first dielectric layer and covering said first segment, said second dielectric layer having a bottom surface, a top surface opposite said bottom surface, and a trench extending from said top surface to said first dielectric layer and having a first side and a second side opposite said first side, said first side being adjacent to a first end of said first segment;
a second segment of said optical waveguide comprising:
a first portion having a second end in end-to-end alignment with said first end of said first segment at said first side, said first portion further directly contacting said first dielectric layer at a bottom of said trench and extending through said trench from adjacent to said first segment at said first side to said top surface at said second side; and,
a second portion continuous with said first portion, said second portion being on said top surface adjacent to said second side; and
a third dielectric layer on said top surface of said second dielectric layer, on said second portion, and within said trench covering said first portion, said first segment and said second segment each having a higher refractive index than said first dielectric layer, said second dielectric layer and said third dielectric layer;
said second end of said first portion of said second segment being physically separated from said first end of said first segment and being positioned less than a predetermined distance from said first end of said first segment.

2. The optoelectronic structure of claim 1,
said trench having a first sidewall on said first side and a second sidewall on said second side, said first sidewall and said second sidewall being angled relative to said bottom of said trench such that said first sidewall and said second sidewall are not perpendicular relative to said bottom,
said first portion of said second segment lining said bottom of said trench and said second sidewall such that said first portion of said second segment is immediately adjacent to a portion of said first dielectric layer at said bottom of said trench and extends laterally from said first segment to said second sidewall and such that said first portion of said second segment is also immediately adjacent to said second sidewall from said bottom of said trench to said top surface of said second dielectric layer.

3. The optoelectronic structure of claim 1,
said trench having a first sidewall on said first side and a second sidewall on said second side,
said first portion of said second segment being immediately adjacent to a portion of said first dielectric layer at a bottom of said trench, and
said first portion further extending laterally from said first segment at said first side toward said second sidewall and curving upward away from said bottom of said trench to said top surface of said second dielectric layer such that a distance between said first portion and said second sidewall tapers from said bottom of said trench to said top surface of said second dielectric layer.

4. The optoelectronic structure of claim 1, said first dielectric layer and said second dielectric layer comprising different dielectric materials.

5. The optoelectronic structure of claim 1, said second dielectric layer and said third dielectric layer comprising any one of a same dielectric material and different dielectric materials.

6. The optoelectronic structure of claim 1, said first segment having a first thickness, said second segment having a second thickness that is essentially equal to said first thickness, and said second dielectric layer having a third thickness that is greater than said first thickness and said second thickness.

7. An optoelectronic structure comprising:
a first dielectric layer;
a first segment of an optical waveguide on said first dielectric layer;
a second dielectric layer on said first dielectric layer and covering said first segment, said second dielectric layer having a bottom surface, a top surface opposite said bottom surface, and a trench extending from said top surface to said first dielectric layer and having a first side and a second side opposite said first side, said first side being adjacent to a first end of said first segment, said trench having a bottom, a first sidewall on said first side and a second sidewall on said second side;
a second segment of said optical waveguide comprising:
a first portion lining said bottom of said trench and said second sidewall such that said first portion has a second end in end-to-end alignment with said first end of said first segment at said first side, directly contacts said first dielectric layer at said bottom of said trench and extends through said trench from adjacent to said first segment at said first side, along said bottom of said trench, and further along said second sidewall of said trench to said top surface at said second side; and,
a second portion continuous with said first portion, said second portion being on said top surface adjacent to said second side; and
a third dielectric layer on said top surface of said second dielectric layer, on said second portion and within said trench covering said first portion, said first segment and said second segment each having a higher refractive index than said first dielectric layer, said second dielectric layer and said third dielectric layer;
said second end of said first portion of said second segment being physically separated from said first end of said first segment and being positioned less than a predetermined distance from said first end of said first segment.

8. The optoelectronic structure of claim 7, said second segment being physically separated from at least an upper portion of said first sidewall.

9. The optoelectronic structure of claim 7, said first sidewall and said second sidewall being angled relative to said bottom of said trench such that said first sidewall and said second sidewall are not perpendicular relative to said bottom.

10. The optoelectronic structure of claim 7, said first dielectric layer and said second dielectric layer comprising different dielectric materials.

11. The optoelectronic structure of claim 7, said second dielectric layer and said third dielectric layer comprising any one of a same dielectric material and different dielectric materials.

12. The optoelectronic structure of claim 7, said first segment having a first thickness, said second segment having a second thickness that is essentially equal to said first thickness, and said second dielectric layer having a third thickness that is greater than said first thickness and said second thickness.

13. An optoelectronic structure comprising:
a first dielectric layer;
a first segment of an optical waveguide on said first dielectric layer;
a second dielectric layer on said first dielectric layer and covering said first segment, said second dielectric layer having a bottom surface, a top surface opposite said bottom surface, and a trench extending from said top surface to said first dielectric layer and having a first side and a second side opposite said first side, said first side being adjacent to a first end of said first segment, said trench having a bottom, a first sidewall on said first side and a second sidewall on said second side;
a second segment of said optical waveguide comprising:
a first portion having a second end in end-to-end alignment with said first end of said first segment at said first side, said first portion further directly contacting said first dielectric layer at a bottom of said trench, extending laterally from adjacent said first segment at said first side toward said second side and further curving upward away from said bottom of said trench to said top surface of said second dielectric layer at said second side, said first portion being physically separated from said second sidewall with a distance between said first portion and said second sidewall tapering from said bottom of said trench to said top surface of said second dielectric layer; and,
a second portion continuous with said first portion, said second portion being on said top surface adjacent to said second side, said first segment having a first thickness, said second segment having a second thickness that is essentially equal to said first thickness, and said second dielectric layer having a third thickness that is greater than said first thickness and said second thickness; and,
a third dielectric layer on said top surface of said second dielectric layer, on said second portion and within said trench covering said first portion and filling a space between said first portion and said second sidewall, said first segment and said second segment each having a higher refractive index than said first dielectric layer, said second dielectric layer and said third dielectric layer;
said second end of said first portion of said second segment being physically separated from said first end of said first segment and being positioned less than a predetermined distance from said first end of said first segment.

14. The optoelectronic structure of claim 13, said second segment being physically separated from at least an upper portion of said first sidewall.

15. The optoelectronic structure of claim 13, said first sidewall and said second sidewall being one of angled and curved relative to said bottom of said trench such that said first sidewall and said second sidewall are not perpendicular relative to said bottom.

16. The optoelectronic structure of claim 13, said first dielectric layer and said second dielectric layer comprising different dielectric materials.

17. The optoelectronic structure of claim 13, said second dielectric layer and said third dielectric layer comprising any one of a same dielectric material and different dielectric materials.

* * * * *